United States Patent
Metcalfe et al.

[19]

[11] Patent Number: 5,805,724
[45] Date of Patent: Sep. 8, 1998

[54] METHOD AND SYSTEM FOR HYBRID ERROR DIFFUSION PROCESSING OF IMAGE INFORMATION USING DYNAMIC SCREENS BASED ON BRIGHTNESS/DARKNESS SETTINGS

[75] Inventors: David J. Metcalfe, Marion; Roger L. Triplett, Penfield; John T. Newell, Fairport; Xiao-fan Feng, Webster, all of N.Y.

[73] Assignee: Xerox Corporation, Stamford, Conn.

[21] Appl. No.: 719,097

[22] Filed: Sep. 24, 1996

[51] Int. Cl.$^6$ .......................... H04N 1/405; G06K 9/38; G06T 5/00

[52] U.S. Cl. .................. 382/176; 382/237; 382/252; 382/270; 358/456; 358/457; 358/462

[58] Field of Search .............................. 382/237, 252, 382/270, 176, 173; 358/456, 457, 458, 460, 462, 534, 535, 536; 395/109

[56] References Cited

U.S. PATENT DOCUMENTS

| | | | |
|---|---|---|---|
| 4,196,453 | 4/1980 | Warren | 358/460 |
| 4,633,327 | 12/1986 | Roetling | 358/456 |
| 4,866,534 | 9/1989 | Tada | 358/456 |
| 5,243,443 | 9/1993 | Eschbach | 358/456 |
| 5,424,854 | 6/1995 | Hashimoto | 358/456 |
| 5,471,543 | 11/1995 | Ng et al. | 382/173 |

*Primary Examiner*—Scott Rogers
*Attorney, Agent, or Firm*—Michael J. Nickerson

[57] ABSTRACT

A printing system for rendering marks on a recording medium receives a multi-level grey scale pixel value representing a pixel having a first resolution. A screening circuit generates a screened multi-level grey scale pixel value equal to $(G_L-V_i)+(S_i-Th)*Dmp_{vi}*Mod_{Eff}$ wherein $G_L$ is the maximum grey level value of the pixel, $V_i$ is equal to the multi-level grey scale pixel value of the first resolution, $S_i$ is equal to a screen value corresponding to a position of the pixel, the image classification of the pixel and a brightness/darkness setting, The threshold value, $Dmp_{vi}$ is a video dependent dampening factor, and $Mod_{Eff}$ is a modulation multiplication factor. An interpolator converts the screened multi-level grey scale pixel value to a second resolution, the second resolution being higher than the first resolution, and a binarization circuit binarizes the converted multi-level grey scale pixel value so as to output a binary signal and an error value, the error value having a resolution equal to the first resolution. The error value is diffused to multi-level grey scale pixel values corresponding to pixels adjacent to the pixel having the first resolution, and the binary signal is converted into a mark on the recording medium.

43 Claims, 23 Drawing Sheets

| 64 | 192 | 128 | 64 | 192 | 128 | 64 | 192 | 128 |
|---|---|---|---|---|---|---|---|---|
| 64 | 192 | 128 | 64 | 192 | 128 | 64 | 192 | 128 |
| 64 | 192 | 128 | 64 | 192 | 128 | 64 | 192 | 128 |
| 64 | 192 | 128 | 64 | 192 | 128 | 64 | 192 | 128 |

| 64 | 192 | 128 | 64 | 192 | 128 | 64 |
|---|---|---|---|---|---|---|
| 128 | 64 | 192 | 128 | 64 | 192 | 128 |
| 192 | 128 | 64 | 192 | 128 | 64 | 192 |
| 64 | 192 | 128 | 64 | 192 | 128 | 64 |

METHOD AND SYSTEM FOR HYBRID ERROR DIFFUSION PROCESSING OF IMAGE INFORMATION USING DYNAMIC SCREENS BASED ON BRIGHTNESS/DARKNESS SETTINGS

FIELD OF THE PRESENT INVENTION

The present invention relates to the conversion of images from multi-level grey scale pixel values to a reduced number of levels pixel values. More specifically, the present invention relates to the conversion of multi-level grey scale pixel values to a reduced number of levels pixel values using a combined screening and error diffusion technique wherein the screens are dynamically changed based on user defined brightness/darkness settings.

BACKGROUND OF THE PRESENT INVENTION

Image information, be it color or black and white, is commonly derived by scanning, initially at least, in a grey level format containing a large number of levels, e.g.: 256 levels for black and white and more than 16 million ($256^3$) levels for color. This multi-level format is usually unprintable by standard printers.

The term "grey lever" is used to described such data for both black and white and color applications. Standard printers print in a limited number of levels, either a spot or a no spot in the binary case, or a limited number of levels associated with the spot, for example, four in the quaternary case. Since grey level image data may be represented by very large values, it is necessary to reduce grey level image data to a limited number of levels so that it is printable. Besides grey level image information derived by scanning, certain processing techniques, such as computer generation, produce grey level pixel values which require such a conversion.

One standard method of converting grey level pixel image data to binary level pixel image data is through the use of screening, dithering, or halftoning. In such arrangements, over a given area, each grey level pixel within the area is compared to one of a set of distinct preselected thresholds. The set of thresholds comprises a matrix of threshold values or a halftone cell.

In a typical circuit, an unmodified image or video signal is fed into a modulation circuit with a screen value from a halftone screen matrix to produce a modified signal. The modified signal is then thresholded by a binarization circuit to produce a binary output. The binary output represents either the ON or OFF characteristic of the processed pixel. It is noted that the screen could be developed so as to replace the threshold value such that the threshold value would change from pixel to pixel and the system would not require the adding of the screen value before thresholding. These are equivalent systems. For a fixed video signal V, the screen modulated video signal $V_s'$ has values varying between the levels A and B as the screen value S vary between 255 and 0. Thus, the effective white and black values to be used in the binarization process or calculation should be, for example, for the value of white, 0 and, for the value of black, 255.

In the described process, the sampled image picture elements are compared with a single threshold, and a black/white decision is made. However, the threshold relationship is modified by modulating the image data with the screen data. The screen data is selected in sequential order from a two-dimensional matrix defined as a halftone cell threshold set. The set of screen values and the arrangement therein determine the grey scale range, frequency, angle, and other properties of the halftone pictorial image.

The effect of such an arrangement is that, for an area where the image is grey, some of the thresholds within the matrix will be exceeded, while others are not. In the binary case, the portions of the matrix, or cell elements, in which the thresholds are exceeded are printed as white, while the remaining elements are allowed to remain black or vice-versa depending on the orientation of the system, (write white system or write black system). For example, 255 may represent white in one system, (write white), but black in another system, (write black). The effect of the distribution of black and white over the cell is integrated by the human eye as grey.

Although screening provides an adequate method for processing image data, typical screening presents problems in that the amount of grey within an original image is not maintained exactly over an area because the finite number of elements inside each halftone cell only allows the reproduction of a finite number of grey levels. This problem is prevalent in situations where the user desires to adjust the brightness/darkness settings of the image to be reproduced. More specifically, if a user desires that the image be reproduced at a different brightness or darkness, the grey level within a halftone cell should be either decreased or increased, accordingly. However, as noted above, a particular screen only allows a limited number of grey levels for a halftone cell thus, the reproduced image may not reflect the chosen brightness/darkness setting if the chosen brightness/darkness setting corresponds to a grey level that is not available to the screen being used in the screening process.

Therefore, it is desirable to utilize a screening process which can be dynamically adjusted to compensate for variations in the brightness/darkness settings as defined by a user. Moreover, it is desirable to provide a screening process wherein the screens are dynamically changed based on the brightness/darkness settings so as to maximize the number of available grey levels per halftone cell, and thus, provide a faithful reproduction of the brightness/darkness adjusted image.

SUMMARY OF THE PRESENT INVENTION

A first aspect of the present invention is a method of reducing a number of levels in a multi-level grey scale pixel value representing a pixel and diffusing an error generated from reducing the number of levels. The method receives a multi-level grey scale pixel value representing a pixel having a first resolution; receives a brightness/darkness setting value; generates an effect pointer based on an image type of the received multi-level grey scale pixel and a window of pixels surrounding the multi-level grey scale pixel and the brightness/darkness setting value; selects, from a plurality of screens, a screen according to the effect pointer; generates a screen value from the selected screen dependent upon a position of the received pixel; generates a screened multi-level grey scale pixel value utilizing the screen value; reduces the number of levels in the screened multi-level grey scale pixel value; generates an error value as a result of the reduction process; and diffuses the error value to multi-level grey scale pixel values of adjacent pixels.

A second aspect of the present invention is a system for reducing a number of levels in a multi-level grey scale pixel value representing a pixel and diffusing an error generated from reducing the number of levels. The system includes means for generating a brightness/darkness setting value;

image segmentation means for generating an effect pointer based on an image type of a multi-level grey scale pixel to be processed and a window of pixels surrounding the multi-level grey scale pixel and the generated brightness/darkness setting value; screen means for selecting, from a plurality of screens, a screen according to the effect pointer and generating a screen value from the selected screen dependent upon a position of the pixel to be processed; modifying means for generating a screened multi-level grey scale pixel value utilizing the screen value; threshold means for reducing the number of levels in the screened multi-level grey scale pixel value; and error means for generating an error value as a result of the reduction process by said threshold means and diffusing the error value to multi-level grey scale pixel values of adjacent pixels.

A third aspect of the present invention is a system for reducing a number of levels in a multi-level grey scale pixel value representing a pixel and diffusing an error generated from reducing the number of levels. The system includes a brightness/darkness circuit to generate a brightness/darkness setting value; an image segmentation circuit to generate an effect pointer based on an image type of a multi-level grey scale pixel to be processed and a window of pixels surrounding the multi-level grey scale pixel and the generated brightness/darkness setting value; a screen circuit, including a look-up table, to select, from a plurality of screens, a screen according to the effect pointer and generating a screen value from the selected screen dependent upon a position of the pixel to be processed; an adder to generate a screened multi-level grey scale pixel value with the screen value; a threshold circuit to reduce the number of levels in the screened multi-level grey scale pixel value; and an error diffusion circuit to generate an error value as a result of the reduction process and diffuse the error value to multi-level grey scale pixel values of adjacent pixels.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustration purposes only and should not be limitative of the scope of the present invention, wherein.

DETAILED DESCRIPTION OF THE PRESENT INVENTION

Figure 1:
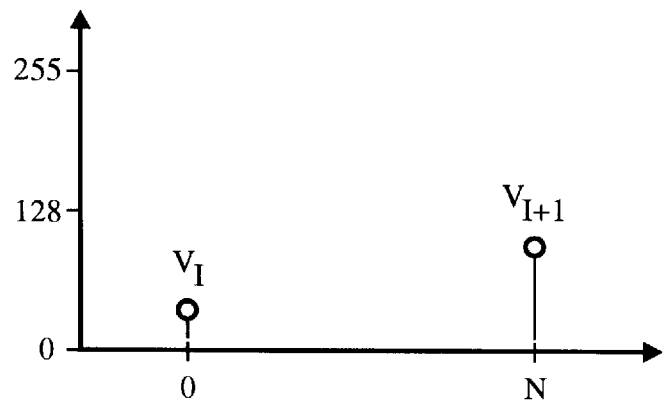
FIG. 1 shows a graphical representation of obtaining boundary subpixel values.
Figure 2:
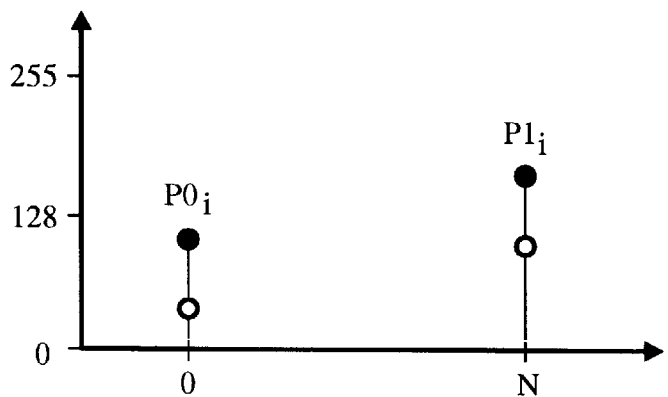
FIG. 2 shows a graphical representation of modifying the obtained boundary subpixel values with an error component.

The following will be a detailed description of the drawings illustrated in the present invention.

Typically, the image processing architecture of a printing system uses either the functions of screening, thresholding, or error diffusion. For pixels to be thresholded, a modified video signal, $V_T'$, is computed from the pixel video signal V. The modified video signal, $V_T'$, is defined as $V_T'=(T+255-V)/2$ in a system having 256 grey levels. In this definition, T is the desired threshold level. It is noted that for T and V between 0 and 255, the computed V' will also be in the range of 0 to 255.

For pixels to be screened, a similar modified video signal, $V_S'$, is computed from the pixel video signal V and the screen value S at the pixel location. The modified video signal, $V_S'$, for a screening process is defined as $V_S'=(S+255-V)/2$ in a system having 256 grey levels. The screen value S depends on the pixel location as well as the halftone screening pattern being used. It is noted that either a line screen or a dot screen can be used.

For pixels to be rendered by error diffusion, the modified video signal is simply the video signal inverted. More specifically, the modified video signal is defined as $V_{ED}'=255-V$ in a system having 256 grey levels.

In the final step of binarization, all the modified video signals; $V_T'$, $V_S'$, and $V_{ED}'$; are compared with 128 to determine the ON or OFF characteristics of the pixel. Namely, if the modified video signal is greater than or equal to 128, the pixel should be OFF (black), otherwise it should be ON (white). It is noted that this gives the same result as the more typical approach of comparing the video V itself with the threshold T or the screen values S. In the case of error diffusion, the appropriate error propagated from the previous pixels must be added to V' before comparing with 128 and the error to be propagated to downstream pixels must also be computed afterwards.

However, it is desirable to screen the video signal at a higher frequency while maintaining the available number of grey levels. To realize this result, it has been proposed to utilize an image processing system which performs a screening process prior to an error diffusion process. More specifically, this hybrid error diffusion process, in a system having 256 grey levels, first computes the modified video signal $V_S'$ utilizing the screening method disclosed above. This computation uses screen values from a small one-dimensional screen cell. After computing the modified video signal $V_S'$, the screened modulated video signal $V_S'$ is processed by an error diffusion process. In the preferred embodiment of the hybrid error diffusion system, this error diffusion process is a high addressability error diffusion process.

Although this hybrid approach provides a good reproduction of the scanned image, the hybrid approach still encounters a few problems. For example, the distribution error generated for a hybrid process utilizing the screening equation described above, (screening and error diffusion), is not compatible with a straight error diffusion process because the white reference points and black reference points are not the same for both processes.

Figure 24:
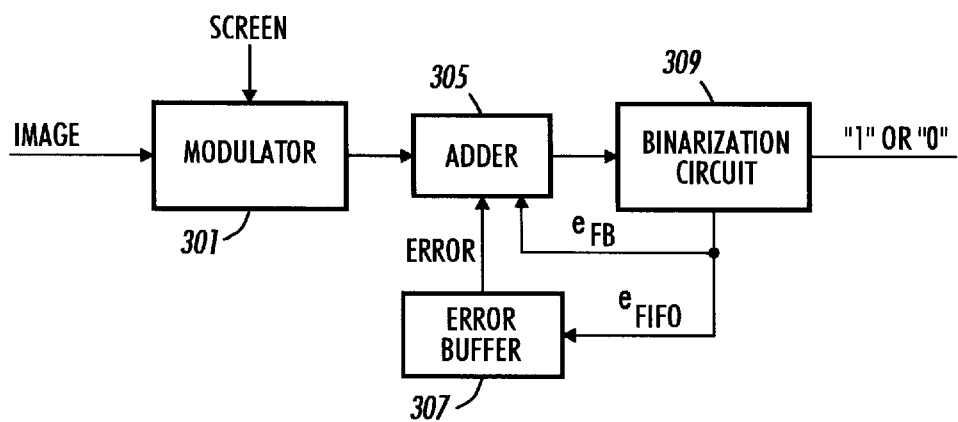
FIG. 24 shows a block diagram illustrating a screening/binarization process.
Figure 25:
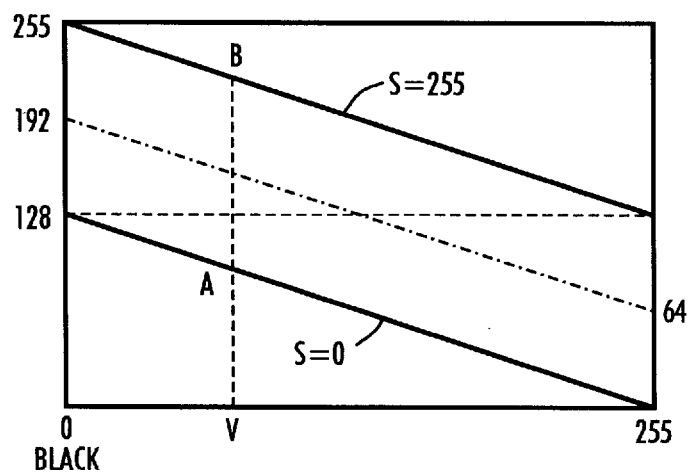
FIG. 25 shows a graphic representation of a typical screening process.

FIG. 24 illustrates a circuit which performs a screening/error diffusion process on an eight-bit image value that reduces the problems associated with the straight hybrid process. In FIG. 24, an unmodified video or image signal is screened by modulator 301 to produce a modified signal $V_S'$ using the preferred equation of $V_S'=(G_L-V_i)+(S_i-Th)$ wherein $S_i$ is equal to screen values derived from a halftone screen pattern, $V_i$ is the grey input video, $G_L$ is a maximum grey level value for a pixel in the system, and Th is the threshold values used in the binarization process.

This modified signal $V_S'$ is fed into adder 305 where the signal is further modified by the addition of an error value propagated from upstream processed pixel locations to produce $V_S''$ ($V_S''=V_S'+e_i$). The error component ($e_{FIFO}+e_{FB}$) utilized by adder 305 is received from error buffer 307 ($e_{FIFO}$) which stores the propagated error and binarization circuit 309 ($e_{FB}$).

The further modified signal $V_S''$ is fed into binarization circuit 309 which converts the multi-level modified signal $V_S''$ to a binary output by utilizing an error diffusion/threshold process. Some of the error ($e_{FB}$) from this process is fed back directly to the next to be processed pixel while the rest ($e_{FIFO}$) is stored in the error buffer 307 for processing of pixels in the next scanline. The apportionment of the error is based on weighting coefficients. Any set of coefficients can be used. In the preferred embodiment of the present invention, the weighting coefficients are the coefficients described in U.S. Pat. No. 5,353,127. The entire contents of U.S. Pat. No. 5,353,127 are hereby incorporated by reference.

In this binarization process, the error that is produced represents the difference between the desired output, the multi-level image data value, and the actual output value which is either 255 or 0 if the multi-level of the image data is represented by 8 bits. This error is diffused, thereby retaining as much grey level information as possible.

By using the circuit of FIG. 24, the present invention can realize a hybrid video transformation which fully utilizes the entire eight-bit grey scale system. This hybrid video transformation realizes a black reference line value of 255 and a white reference line value of 0, thereby expanding the dynamic range of the hybrid image processing system.

As noted above, in the preferred embodiment, the error diffusion process is a high addressability error diffusion process; therefore, the screening/high addressability error diffusion process will be explained in more detail below. Initially, the high addressability error diffusion process will be briefly described.

To extend the conventional error diffusion process, described above, to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the high addressability error diffusion process, it is assumed that the input grey levels at pixel location i and pixel location i+1 are represented by $V_i$ and $V_{i+1}$, respectively, wherein $V_i'=(G_L-V_i)+(S_i-Th)$, and $V_{i+1}'=(G_L-V_{i+1})+(S_{i+1}-Th)$. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

With respect to a first interpolation scheme, the steps for determining the printing or rendering of a subpixel are as follows.

Initially, the modified pixel values $P0_i=V_{i-1}+e_{i-1}$ and $P1_i=V_i+e_i$ are computed wherein $V_i'=(G_L-V_i)+(S_i-Th)$, and $V_{i-1}'=(G_L-V_{i-1})+(S_{i-1}-Th)$. The subpixels are denoted by 0 to N−1 wherein the high addressability characteristic is N. The high addressability characteristics is the number of subpixels that a printer can produce compared to the throughput bandwidth of the image processing system. In other words, the high addressability characteristic defined as the number of subpixels that the image output terminal can render from one pixel of image data.

High addressability is important in situations where the device can process the image data at one resolution, but print at a higher resolution. In such a situation, the present invention can take advantage of a processing system designed for a lower resolution image, (lower resolution can be processed quicker and less expensively), and a printing device which, through laser pulse manipulation, can print at a higher resolution. For example, the image can be processed at 600×600×8 and printed at 2400×600×1 using the high addressability process of the present invention. In the above example, the high addressability characteristic is 4. If the image was processed at 600×600×8 and printed at 1200×600×1, the high addressability characteristic would be 2.

The interpolated subpixel values are computed as $B_n=P0+n(P1-P0)/N$ for n=0 to N−1. The interpolated subpixel values are then compared with a threshold value which in most cases is 128, assuming that the video value ranges from 0 to 255 ($G_L$ is equal to 255). If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N, wherein y is the number of subpixels turned ON. The error is then multiplied by a set of weighting coefficients and distributed to the downstream pixels as in the first version.

More specifically, the screened inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

Figure 22:
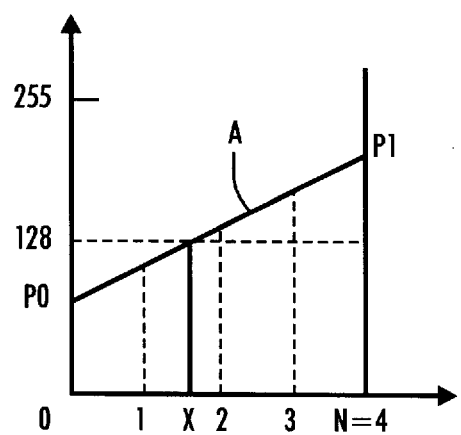
FIG. 22 shows a graph illustrating subpixel interpolation; is

As noted above, the modified pixel values $P0_i=V_{i-1}+e_{i-1}=P1_{i-1}$ and $P1_i=V_i+e_i$ are computed at two locations corresponding to the input resolution wherein $V_i=(G_L-V_i)+(S_i-Th)$ and $V_{i-1}=(G_L-V_{i-1})+(S_{i-1}-Th)$. An example of this is illustrated in FIG. 22 wherein the subpixels are denoted by 0 to N−1. In FIG. 22, the high addressability characteristic, N, is equal to 4.

As illustrated in FIG. 24, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized and any threshold value may be used.) The intersection of the line connecting P0 and P1 and the line representing the threshold at 128 determines which subpixels are to be rendered or printed. The X coordinate of the point of intersection is determined and normalized to N by the equation X=N (128−P0)/(P1−P0).

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 22, that the value of X does not necessarily compute to a whole number or subpixel, thereby making any analysis include a fractional component. To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than n, and if P1 is less than 128, only the subpixels from 0 to n are turned ON and the rest of the subpixels are turned OFF; otherwise, the subpixels from 0 to n are turned OFF and the rest are turned ON. If X is greater than or equal to n and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, (P0+P1)/2, and the actual output, namely b*255/N where b is the number of subpixels that were turned ON. The converted error is then multiplied by a set of weighting coefficients and distributed to the downstream pixels.

The second interpolation method with respect to implementing the high addressability error diffusion method of the present invention will be describe as follows.

Figure 23:
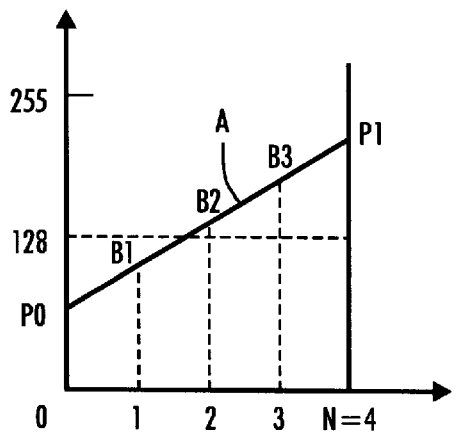
FIG. 23 shows a graph illustrating another subpixel interpolation method.
Figures 26, 27, 28:
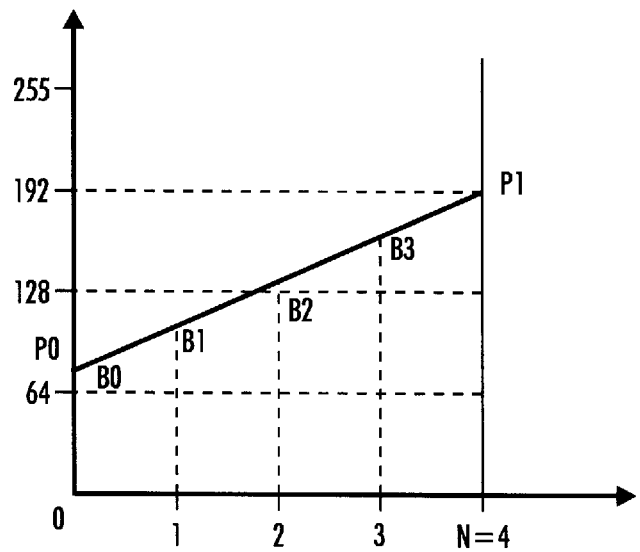
FIG. 26 shows a graphical representation illustrating interpolation and binarization processes.
FIG. 27 shows a graphic representation illustrating a vertical line screen pattern.
FIG. 28 shows a graphical representation illustrating a diagonal line screen pattern.

In the second interpolation method, the modified pixel values $P0_i=V_i+e_i$ and $P1_i=V_{i+1}+e_i$ are computed wherein $V_i=(G_L-V_i)+(S_i-Th)$ and $V_{i+1}=(G_L-V_{i+1})+(S_{i+1}-Th)$. FIG. 23 illustrates the values P0 and P1 for the second version of the high addressability error diffusion method of the present invention. In this method, the value $e_i$ represents the rendering error propagated to the present i-th pixel from the previous pixels. At the i-th pixel location, the subpixel values are given by $P0=V'_{S\,i}+e_i=V''_{S\,i}$ and $P1=V'_{S\,i+1}e_i=V''_{S\,i+1}$ wherein $V'_{S\,i}=(G_L-V_i)+(S_i-Th)$ and $V'_{S\,i+1}=(G_L-V_{i+1})+(S_{i+1}-Th)$. The values are used to obtain the interpolated values $B_0$ to $B_{N-1}$, as shown in FIG. 26. It is noted that the high addressability factor illustrated in FIG. 26 is N=4.

These interpolated values are then compared with 128 to determine the ON or OFF characteristics of the subpixels. If the number of subpixels rendered as black is indicated by n, the current rendering error is given by the desired output minus the actual output, $e'_i=((P0+P1)/2)-(n(255)/N)$. In other words, the actual output is defined as the desired output, (P0+P1)/2), minus the product of the number of ON subpixels and the difference between the black and white reference values divided by the high addressability characteristic. This new error is then multiplied by a set of weighting coefficients and the weighted errors are propagated to the downstream pixels.

To determine the ON or OFF characteristics, the subpixel values are processed by a number of comparison steps. An example of the actual architecture of the circuitry used to implement the high addressability error diffusion process will be discussed below.

FIGS. 1–7 illustrate the computational steps required to perform high addressability error diffusion using a particular interpolation scheme. Initially, as illustrated in FIG. 1, the pixel value $V_i$ and $V_{i+1}$ are obtained wherein $V_i=(G_L-V_i)+(S_i-Th)$ and $V_{i+1}=(G_L-V_{i+1})+(S_{i+1}-Th)$. The actual pixel values are graphically illustrated in FIG. 1, wherein the pixel value $V_i$ represents the pixel value at the subpixel position 0 and the pixel value $V_{i+1}$ represents the pixel value at the Nth subpixel. In FIG. 1, the pixel values range from 0 to 255 utilizing a conventional eight-bit dataword to represent the multi-level grey value of the image data to be process. It is noted that any range can be utilized to represent the grey level value of the image data; for example, 0 to 511, 0 to 127, etc.

After obtaining the initial pixel values of $V_i$ and $V_{i+1}$, a diffused error component $e_i$ (the accumulated error from previous pixel binarization processes) is added to the pixel values $V_i$ and $V_{i+1}$. It is noted that the error component $e_i$ consists of two components, $e_{FIFO}$ and $e_{FB}$, where $e_{FIFO}$ is the summed error component stored in a line buffer and $e_{FB}$ is the feedback error component. The adding of the error component $e_i$ is illustrated graphically in FIG. 2.

Figure 3:
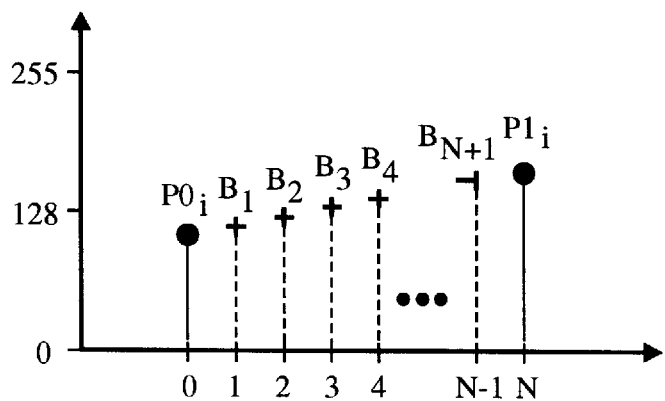
FIG. 3 shows a graphical representation of interpolating subpixel values between the modified boundary subpixel values.
Figure 4:
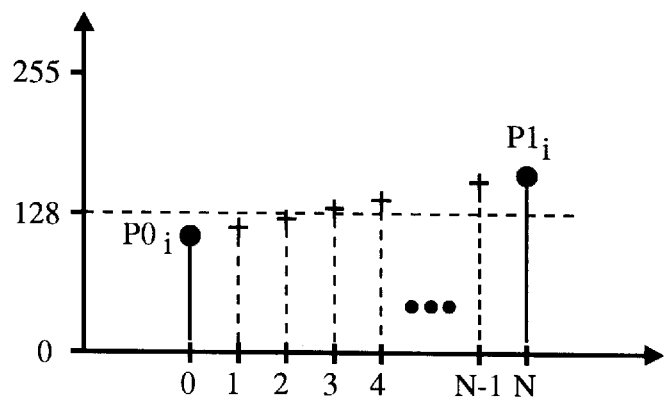
FIG. 4 shows a graphical representation of comparing the interpolated subpixel values with a threshold value.
Figure 5:
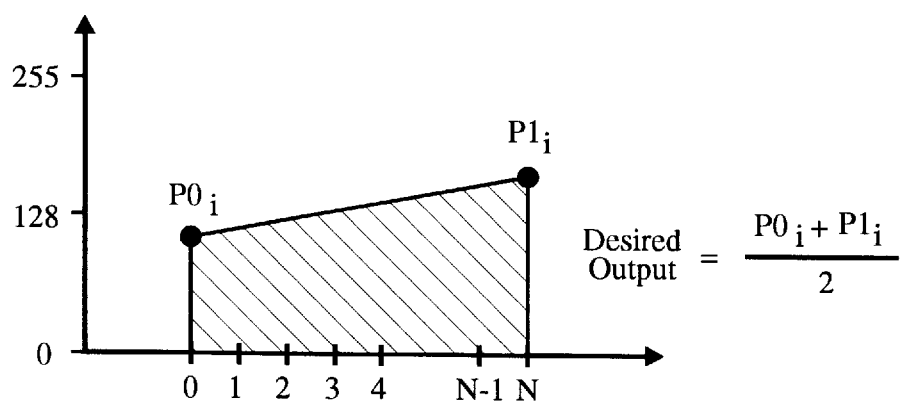
FIG. 5 shows a graphical representation of computing a desired output value.

After adding the diffused error component, the interpolated subpixel values are computed, as illustrated in FIG. 3. For example, the interpolated subpixel values are $B_n=P0_i+n(P1_i-P0_i)/N$ for n=1 to N-1, where N is the selected high addressability characteristic. It is noted that the value $P0_i$ is equal to $V_i+e_i$ and $P1_i$ is equal to $V_{i+1}+e_i$.

After computing the interpolated subpixel values, each interpolated subpixel value is compared to a threshold level. In the example illustrated in FIG. 4, the threshold value is 128. It is noted that this threshold value can be any value within the range of the image data depending upon the desired is results. In this example, each subpixel which has a value greater than or equal to 128 is set ON.

Figure 6:
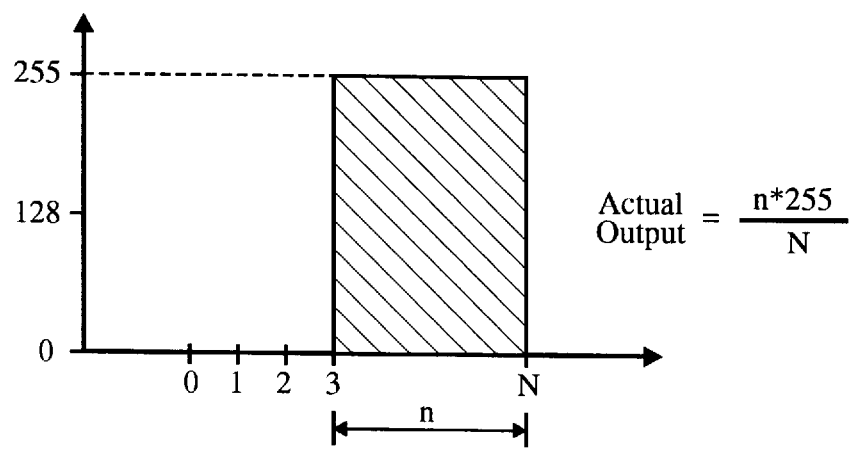
FIG. 6 shows a graphical representation of computing an actual output value.

Next, the desired output $(P0_i+P1_i)/2$ is computed. This computing of the desired output is graphically illustrated in FIG. 5. After computing the desired output, the actual output is computed. In this example, the actual output is equal to n*255/N where n is the number of subpixels that have been turned ON as the result of the comparison illustrated in FIG. 10. A graphical representation of the computed actual output is shown in FIG. 6. Once the desired output and the actual output have been computed, the error diffusion method computes the error to be propagated downstream. This error is computed as the desired output minus the actual output. A graphical representation of this computation is shown in FIG. 7.

Figure 7:
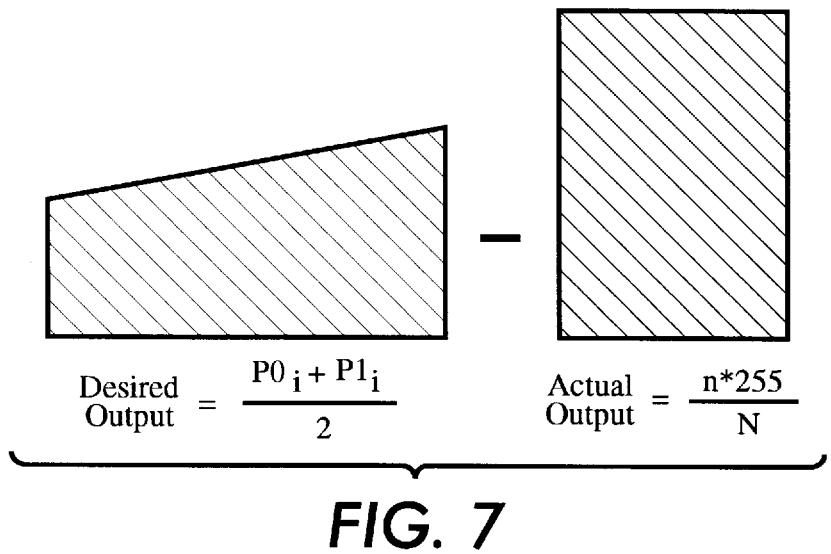
FIG. 7 shows a graphical representation of computing an error value to be propagated to is downstream pixels.
Figure 8:
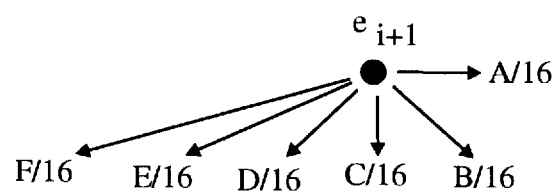
FIG. 8 shows a graphical representation illustrating actual distribution of the error in a typical error distribution routine.

As illustrated in FIG. 7, the error is calculated to be $e_{i+1}=(P0_i+P1_i)/2-(n*255/N)$. In this instance, the error $e_{i+1}$ represents the error from the present binarization process. As in all conventional error diffusion processes, the error from the binarization process is distributed to downstream pixels. The distributing of the error $e_{i+1}$ to downstream pixels is illustrated in FIG. 8. In this example, the distribution of error utilizes a set of error diffusion coefficients which allow fast processing by simple bit shifting. FIG. 8 illustrates the coefficients associated with each pixel location.

Figure 9:
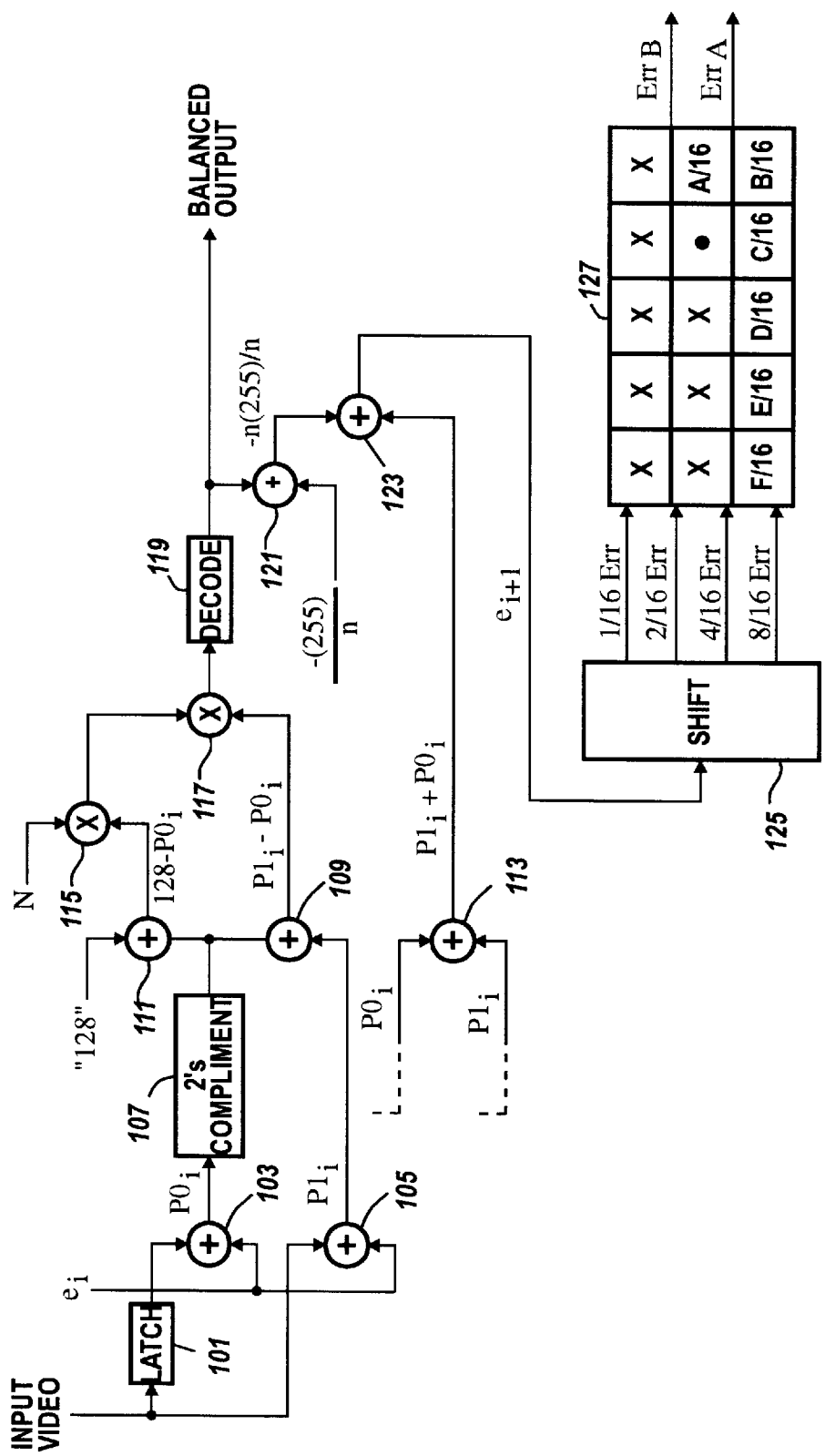
FIG. 9 shows a block diagram illustrating one embodiment of the present invention implementing a high addressability error diffusion process.

As noted above, FIG. 9 illustrates a block diagram of the process described above. In FIG. 9, the screened input video signal is split and latched in latch 101 so as to produce the screened pixel values $V0_i$ and $V1_i$. $V0_i$ represents the latched screened input video signal $V1_i$ as noted above, and $V0_i$ represents the screened pixel value just proceeding the screened pixel value $V1_i$ in the same scanline. The screened pixel value $V0_i$ is fed into an adder 103 with the error component $e_i$. Moreover, the error component $e_i$ is fed into an adder 105 along with the screened input video signal $V1_i$.

The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value $(128-P0_i)$ can be multiplied by the high addressability characteristic value N. The resulting product is then divided by the sum from adder 109 by a divider circuit 117. The resulting quotient is fed into a decoder 119. The actual function of decoder 119 is graphically illustrated in FIG. 10.

Figure 10:
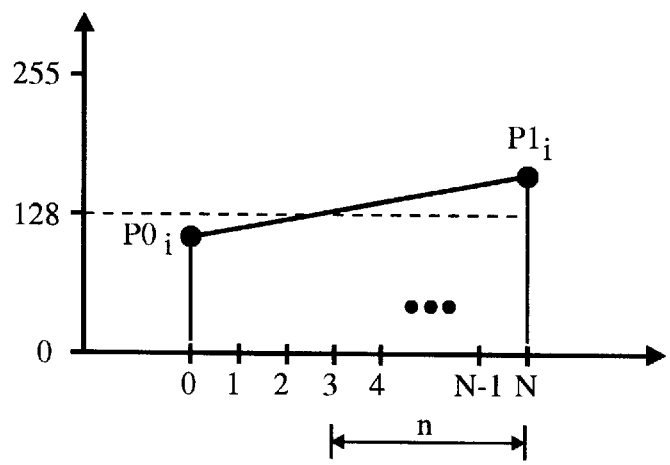
FIG. 10 shows a graphical representation illustrating a decoding process illustrated in FIG. 9.

More specifically, the decoder 119, as illustrated in FIG. 10, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value $(-255/N)$. The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilize in the error distribution process. The error values generated by the bit shifting circuit 125 are fed into an error distribution circuit 127, wherein half the error, $Err_A$, is distributed to the next pixel in the same scanline and the other half of the error, $Err_B$, is distributed to various pixels in the next scanline according to the weighting coefficients established in the error distribution circuit 127.

Figure 11:
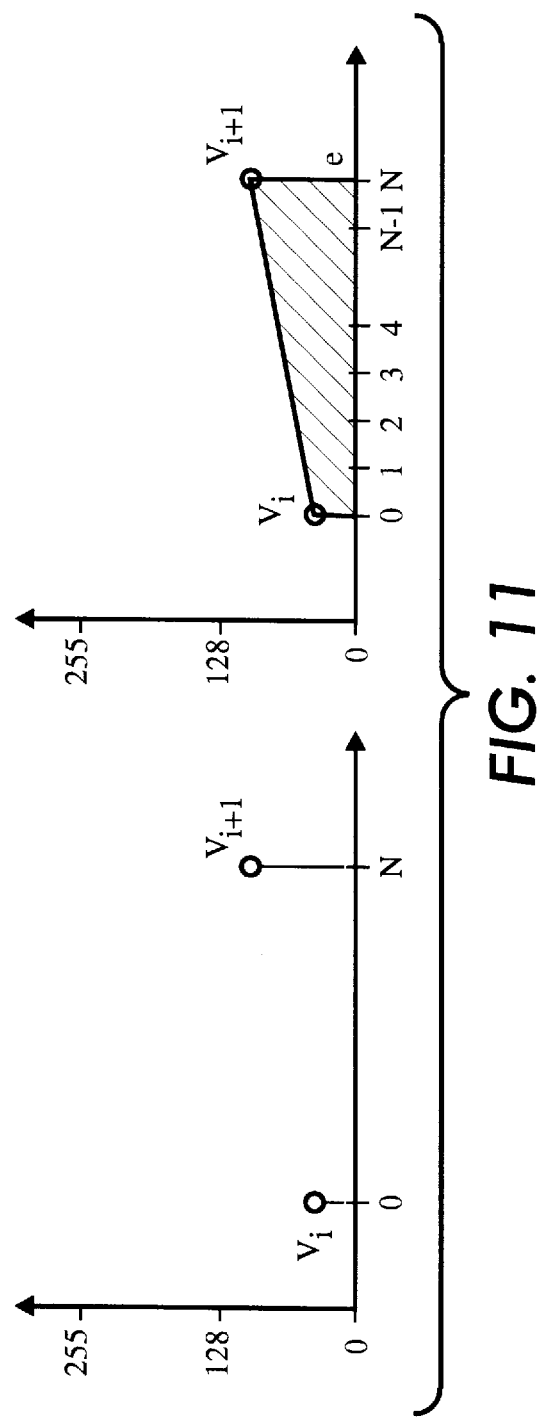
FIG. 11 shows a graphical representation illustrating the obtaining boundary subpixel values in parallel with the computing a desired output value.

FIG. 11 illustrates two parallel computations which are carried out in the present invention. More specifically, FIG. 11 illustrates that the screened pixel values $V_i$ and $V_{i+1}$ are obtained in parallel with the computation of the desired output for a single subpixel wherein the desired output is computed without including the diffused error components $e_{FIFO}$ or $e_{FB}$.

Figure 12:
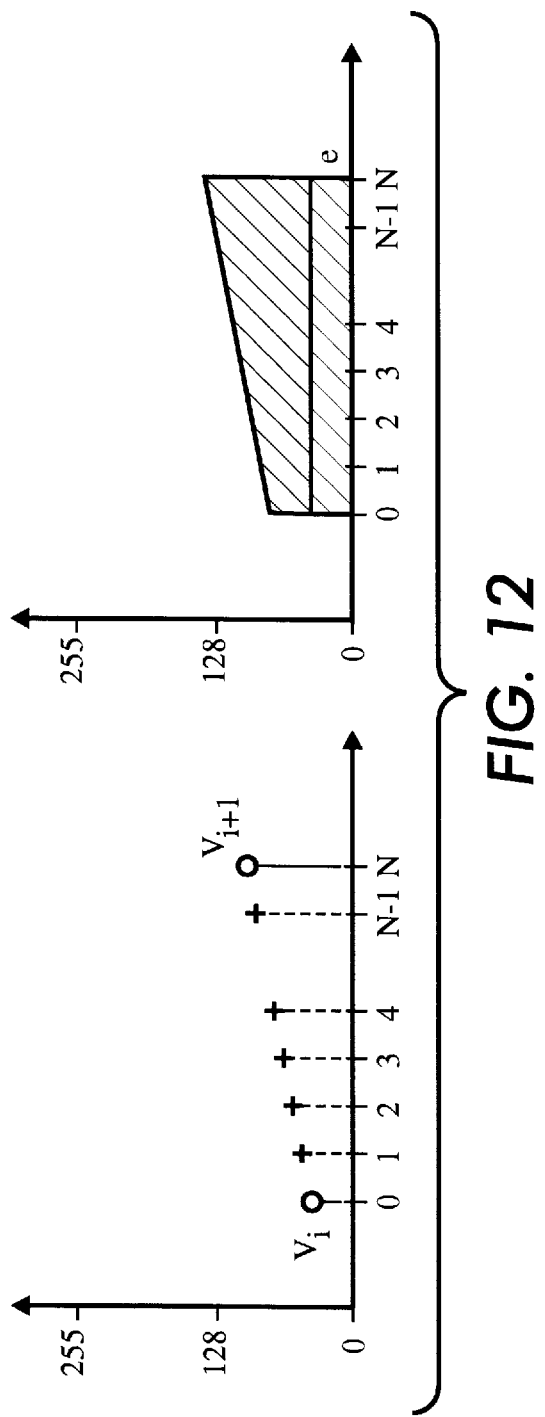
FIG. 12 shows a graphical representation illustrating the interpolating of subpixel values between the obtained boundary subpixel values in parallel with the modifying of the desired output value with an error component.

After these parallel computations are completed, the preferred embodiment of the present invention computes interpolated subpixel values in the same way as illustrated in FIG. 3. However, in parallel with this computation of the interpolated subpixel values, the desired output is continued to be computed by adding the error component $e_{FIFO}$. This is graphically represented in FIG. 12.

Figure 13:
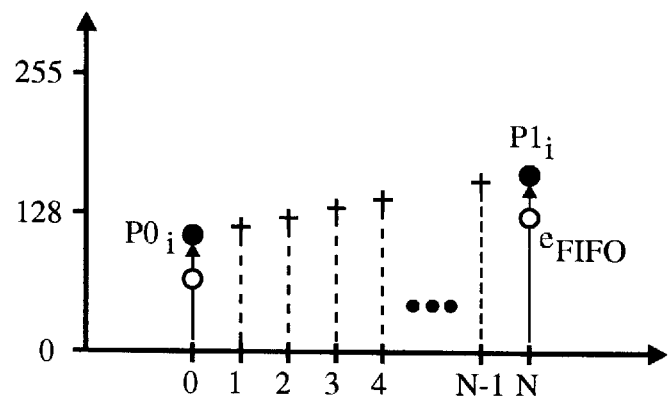
FIG. 13 shows a graphical representation illustrating the modifying of the subpixel values between the obtained boundary subpixel values with an error component.
Figure 14:
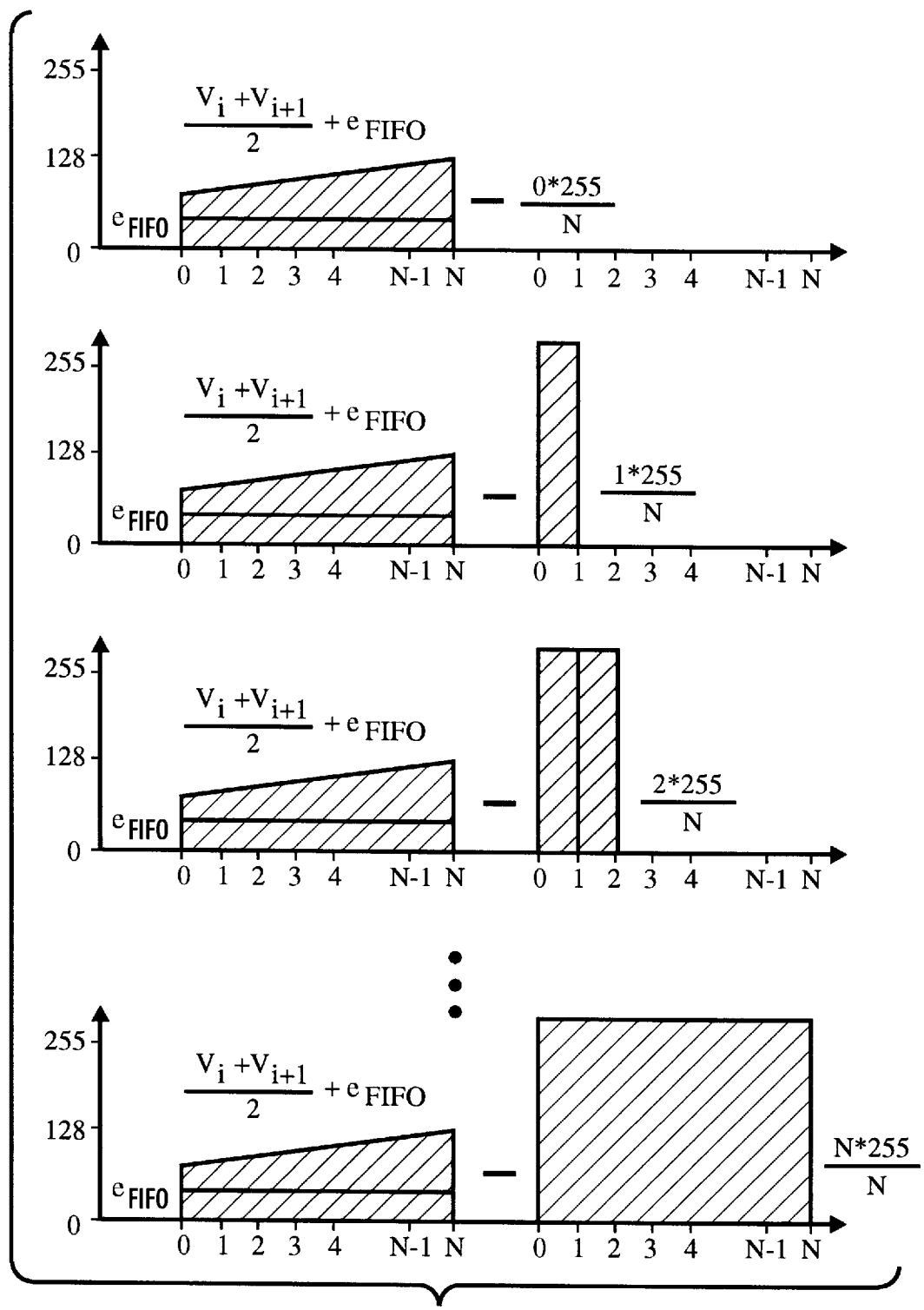
FIG. 14 shows a graphical representation illustrating the calculation of a plurality of partial possible error values.

Next, the error component $e_{FIFO}$ is added to the screened pixel values $V_i$, and $V_{i+1}$ and the interpolated subpixels as illustrated in FIG. 13. At the same time (in parallel thereto), all possible actual subpixel outputs are subtracted from the desired output without including the diffused error component $e_{FB}$. In other words, N possible actual subpixel outputs are subtracted from the desired output computed in FIG. 12 to produce N possible error outputs $e_P$ (the desired output minus the actual output is equal to the error $e_P$). The computations illustrated in FIG. 13 are carried out in parallel with the computations illustrated in FIG. 14.

Figure 15:
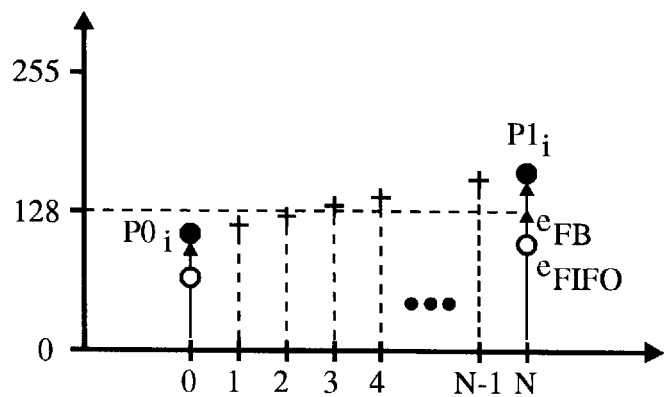
FIG. 15 shows a graphical representation of further modifying the modified subpixel values of FIG. 11 with another error component.
Figure 16:
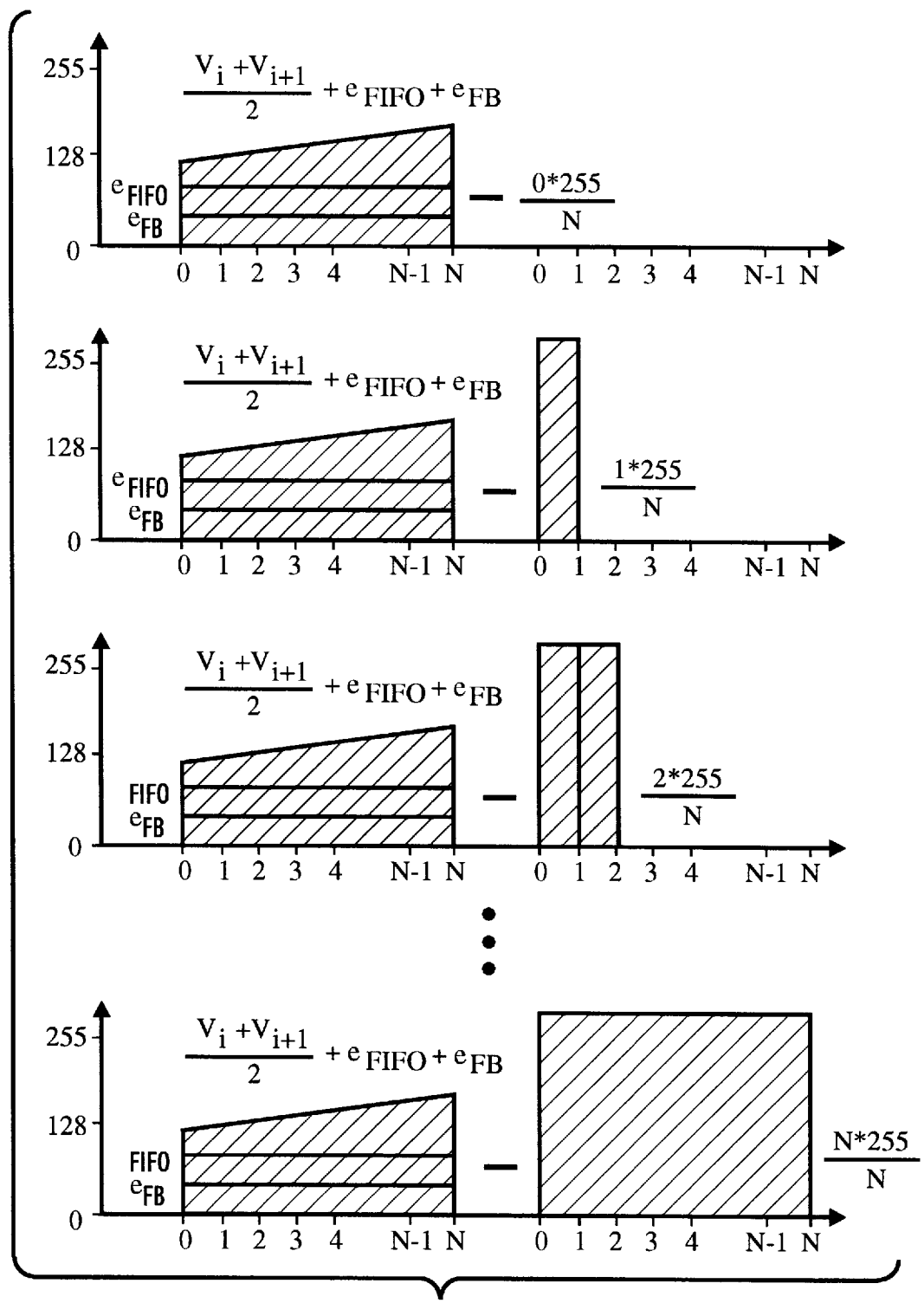
FIG. 16 shows a graphical representation illustrating the calculation of a plurality of complete possible error values.

The error component $e_{FB}$ is added to the screened pixel values $V_i$, $V_{i+1}$, and the various interpolated subpixel values as illustrated in FIG. 15. At the same time that the feedback error component $e_{FB}$ is being added in FIG. 15, the error component $e_{FB}$ is added to all possible subpixel desired outputs as illustrated in FIG. 16. In other words, the error component $e_{FB}$ is individually added to all N error results ($e_P$) stemming from the calculations illustrated by FIG. 14.

Figure 17:
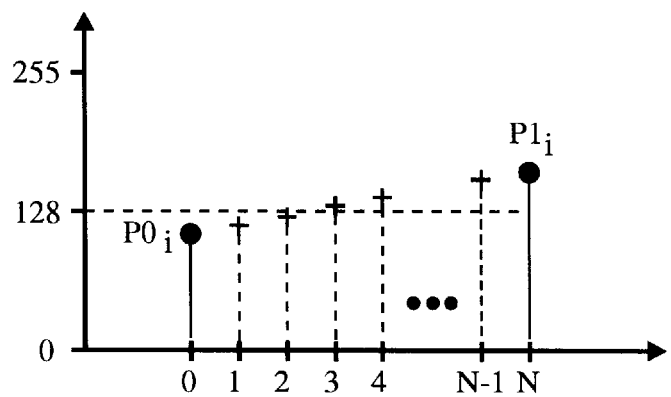
FIG. 17 shows a graphical representation of thresholding the further modified subpixel values.
Figure 18:
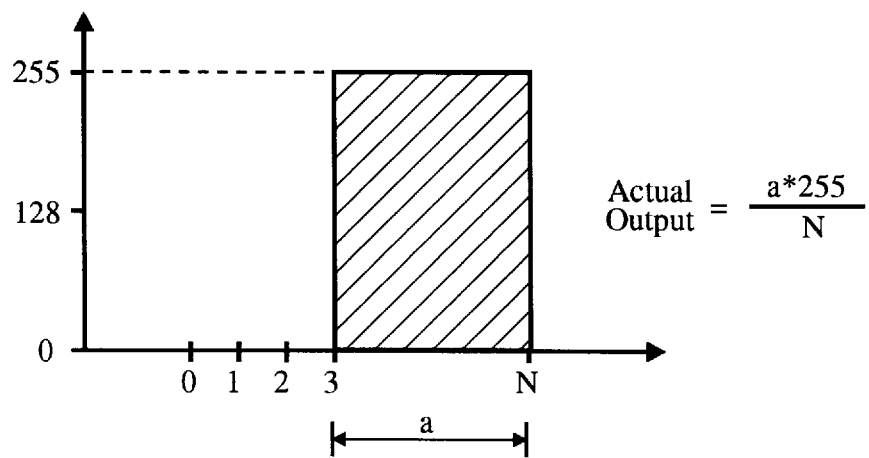
FIG. 18 shows a graphical representation of determining of number of subpixels exceeding or equal to a threshold value.
Figure 19:
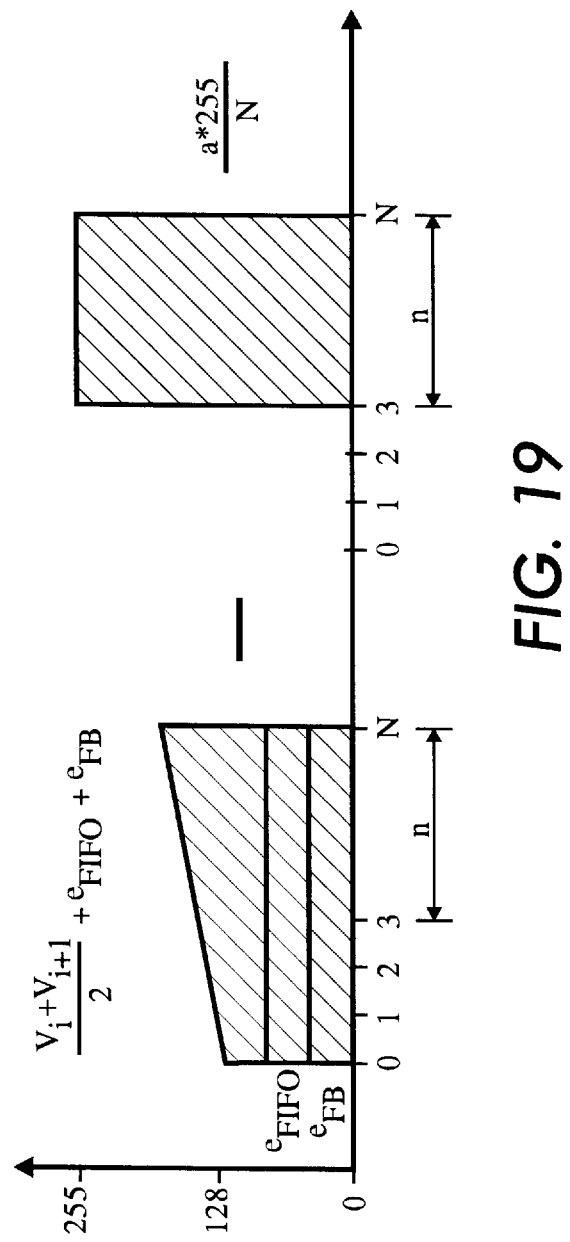
FIG. 19 shows a graphical representation of selecting one of the plurality of possible complete error values.

After completing these parallel computations, the next step includes the computations illustrated in FIGS. 17, 18, and 19. In this next step, each interpolated subpixel value is compared to a threshold value of 128, and the subpixels having a value greater than or equal to the threshold value are turned ON. This process is graphically illustrated in FIGS. 17 and 18 wherein FIG. 17 shows the comparison of the interpolated subpixel values with the threshold values, and FIG. 18 shows the turning ON of the subpixels which have a value greater than or equal to the threshold value.

Since all the possible error values were made simultaneously available as a result of the computations illustrated in FIG. 16, the error to be propagated downstream can now be immediately selected; i.e., via a multiplexer, based upon the number of subpixels which are turned ON. In other words, FIG. 19 illustrates the properly selected error value from the various simultaneously available error values produced by the computations illustrated in FIG. 16. The selected error value is then distributed to downstream pixels utilizing any conventional error diffusion technique. In the preferred embodiment of the present invention, the error is distributed to downstream pixels utilizing the error diffusion coefficients discussed above.

Figure 20:
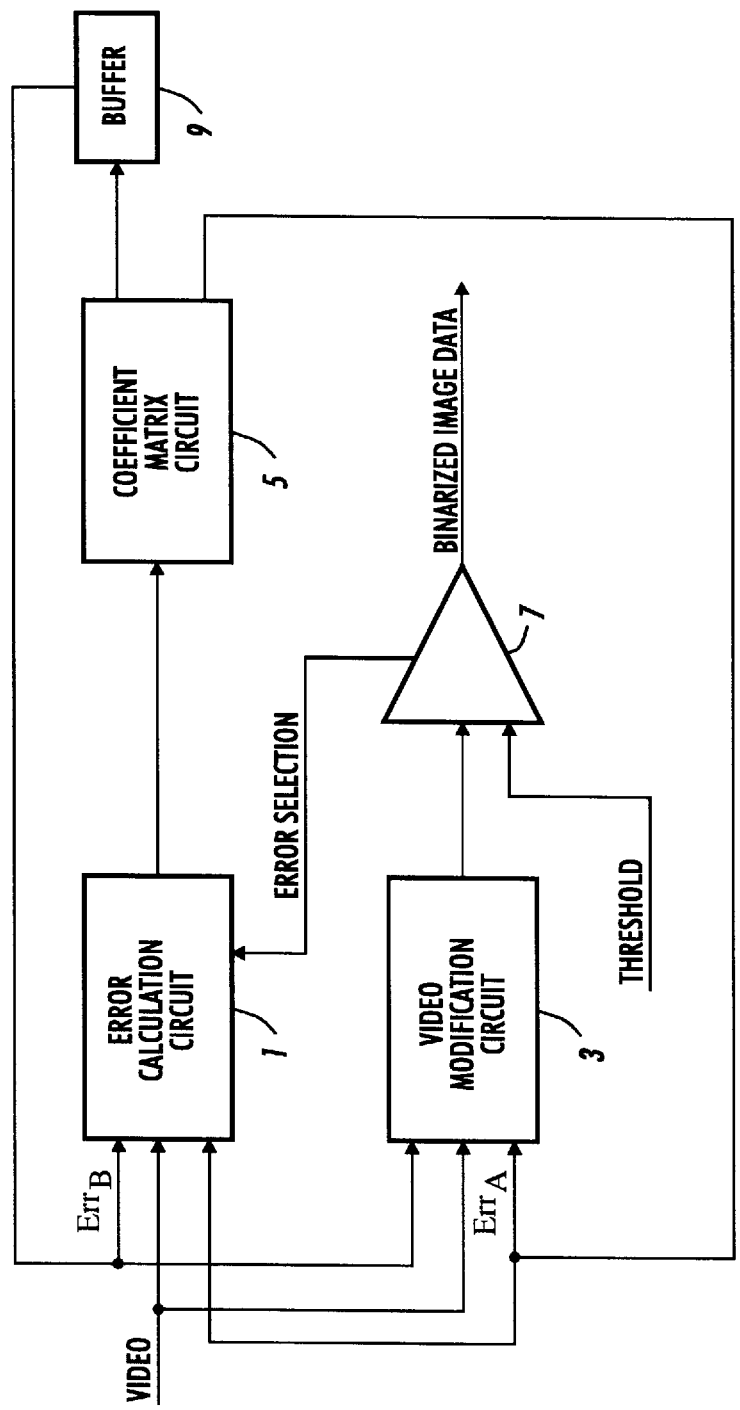
FIG. 20 is a block diagram illustrating implementation of the processes illustrated in FIGS. 11–19.

FIG. 20 illustrates a functional block diagram of the parallel pipeline high addressability error diffusion circuit of the preferred embodiment of the present invention. In FIG. 20, the input screened video signal is fed into an error calculation circuit 1 and a video modification circuit 3. The error components $e_{FIFO}$ ($Err_B$) and $e_{FB}$ ($Err_A$) are also fed into the error calculation circuit 1. The error calculation circuit calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection.

As illustrated in FIG. 20, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

Figure 21:
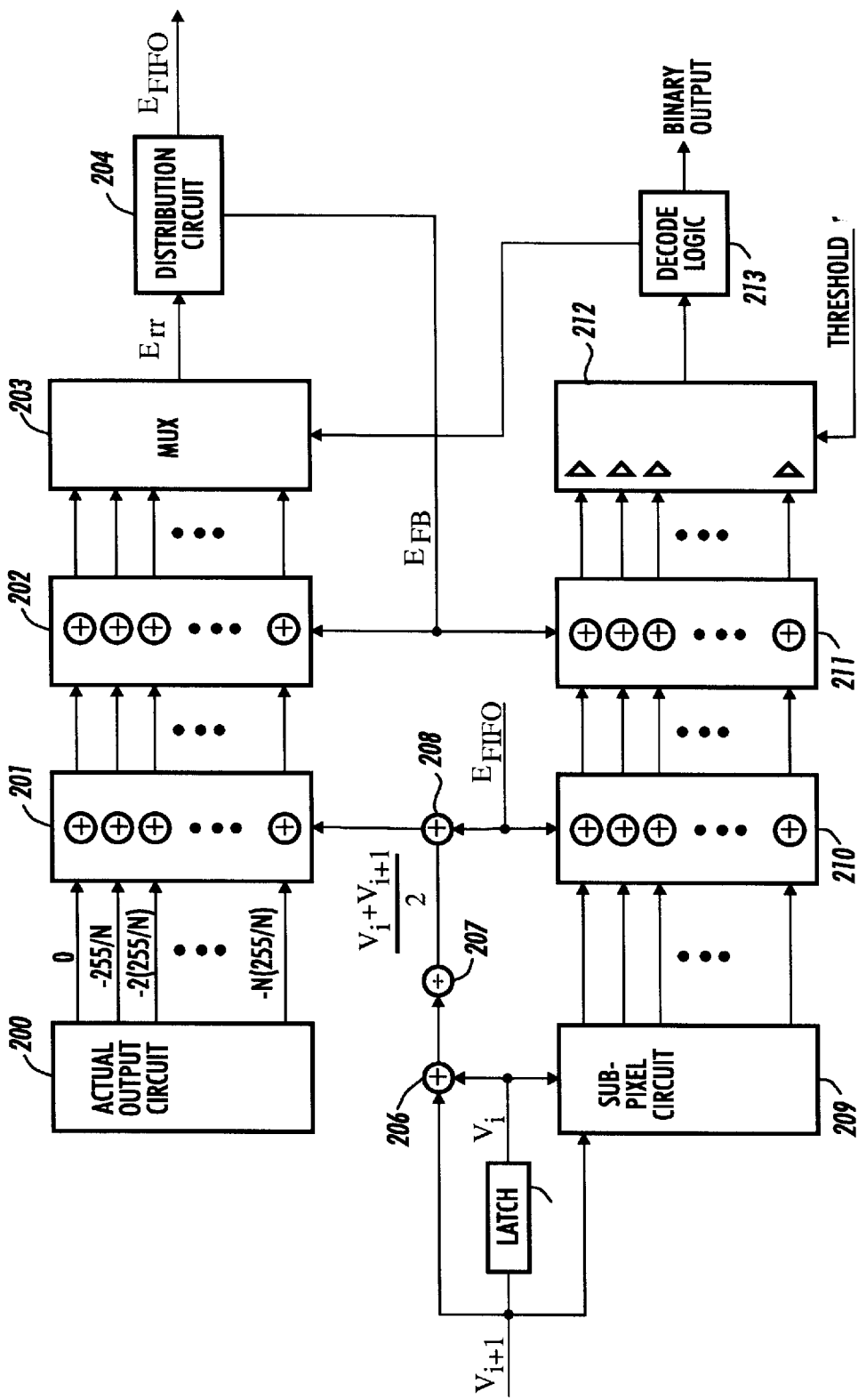
FIG. 21 is a block diagram illustrating circuitry implementation of the processes illustrated in FIGS. 11–19.

FIG. 21 illustrates a detail block diagram of the circuit of the preferred embodiment of the present invention. As illustrated in FIG. 21, many of the computations, as previously described with respect to FIGS. 11–19, are carried out in parallel.

Screened pixel values $V_i$ and $V_{i+1}$ are obtained by the utilization of a latch 205 which latches the screened video signal so that two adjacent fastscan pixels are available for processing. The screened pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N possible actual outputs will be generated. Also in parallel to the above described process, a subpixel circuit 209 generated all the interpolated subpixels based on the screened pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to down stream pixels. The error term is selected based on a control signal received from the decode logic circuit 213. The selected error term is fed into a distribution circuit 204 which produces the next feedback error and the error to be stored in a buffer for utilization in the processing of the next scanline.

The combined screening and high addressability error diffusion rendering can be utilize using a simple vertical line screen pattern as illustrated in FIG. 27. Moreover, the present invention can be utilized with a 45° line screen as illustrated in FIG. 28. The present invention can also be utilized with a dot screen or a constant screen. In the preferred embodiment of the present invention, a dot screen is utilized in a continuous tone region and a constant screen is used in a text region to emulate a simple error diffusion process. This creates smoother transitions from window-to-window or from effect-to-effect since the error stored in the buffer will be within the same range for both continuous tone and text regions.

In the examples described above, it was assumed that the images were processed with full modulation. One problem encountered when rendering images using full modulation under hybrid processing is border artifacts. A border artifact is observed in areas where a sudden input-grey video transition occurs, such as in black to white or white to black text or line boundary regions. Another distracting artifact caused by using full modulation is called background subpixel phenomena. Background subpixel phenomena is observed in areas where the background region is sprinkled with subpixels. These artifacts usually occur when images are generated using 100% hybrid modulation.

To better explain these artifacts, an image having a white background and a solid black box in it's center will be utilized as an example. If such an image was generated utilizing 100% hybrid modulation, the white background would be sprinkled with randomly placed black subpixels. This random scattering of black subpixels in the white background is due to the background subpixel phenomena. Moreover, the edge of the white region would have a uniform pattern of black subpixels which would be caused from the white to black or black to white transition. This uniform pattern of black subpixels causes a border artifact.

Lastly, with respect to the solid black box region within the white background region, the black box image would be randomly sprinkled with white subpixels as a result of the background subpixel phenomena. Moreover, as in the white region, the edge of the black box would contain a uniform pattern of white subpixel forming a border artifact. Thus, the presence of these artifacts reduces the overall quality of the image.

One way to eliminate these artifacts would be to reduce the screen amplitude to a modulation less than 100%. However, it is desirable to have a screen modulation at 100% (when rendering pixels labeled as contone, for example) because the full hybrid dynamic range is used, and thus, a more accurate error is generated and propagated to downstream pixels. Moreover, the benefits of 100% screen modulation with respect to image quality are known and that 100% screen modulation produces smoother regions, especially in the highlight areas.

The reason for the background and border artifacts under full modulation (100% modulation) can best be explained quantitatively. It is noted that under full modulation (100% modulation), the transformed hybrid video can come close to or equal to 128 in the white and black regions of a document. Under error diffusion processing, the threshold level is also equal to 128 when utilizing an 8-bit grey scale image processing system. Hence, when any amount of error is added to this video, the resulting pixel value would cross this threshold (128) and produce a subpixel.

To more clearly explain this phenomena, a hypothetical example using a video value for pixel N equal to 165 ((255−0)+(38−128)+0), [((GL−Vi)+(Si−Th)+Error)], and pixel N+1 having a video value without the error component (Error) of 128 ((255−0)+(1−128)), [((GL−Vi) +(Si−Th))] will be used. By adding a total diffused error component of −4 to the video value of pixel N+1, pixel N+1 drops below the threshold value of 128 thereby creating a white subpixel. In this scenario, the input grey video of both pixel N and pixel N+1 are 0 (black) thus, it would be expected that if the input grey video is representing a solid black region, no white subpixels would be created.

However, the diffused error received from processing previous pixels may occasionally force a video value below the threshold level thus generating a white subpixel. This generation of a white subpixel may either cause a border artifact or a background subpixel artifact. Moreover, the affect described above with respect to the generation of a white subpixel when black grey video is received, is screen dependent and can become more severe for larger element screens.

To significantly reduce or eliminate the border and background subpixel artifacts, a hybrid transformation represented by the equation $V'=(255-V_i)+(S_i-128) * Dmp_{vi}$ is utilized. In this hybrid transformation, $V_i$ is the grey input video, $S_i$ is the screen value, $Dmp_{vi}$ is the dampening factor, and $V'$ is the hybrid video signal resulting from the transformation. By including the dampening factor $Dmp_{vi}$, the amount of modulation can be controlled based upon the value of the input video $V_i$. In other words, the present invention dampens the modulation near the edge of the white and black regions while applying full modulation in the midtone regions. More specifically, the modulation is dampened between the video values 0 and 15 and 240 and 255 for 8-bit grey scale image data. Moreover, full modulation (100% modulation) is applied to a video signal which has values between 15 and 240. By utilizing such a dampening hybrid transformation, the border and background subpixel artifacts are substantially eliminated.

The following is an example of implementing the hybrid dampening transformation. In this example, the video signal is fed into a flip flop whose output is fed into a lookup table which generates the dampening factor $Dmp_{vi}$ based on the value of the input video signal. This dampening factor is fed into another flip flop whose output is fed into a multiplier. In parallel to this process, a screen value associated with the position of the pixel represented by the video is fed into a third flip flop. The output of this flip flop is converted to a value of the screen value minus 128 through the utilization of an inverter. This new value is then fed into a fourth flip flop prior to being fed to the multiplier.

The product from multiplier is fed into a bit shift register so as to produce a value equal to $(S_i-128) * Dmp_{vi}$. The dampened screen value is then fed into a fifth flip flop prior to being fed to an adder. At the adder, the dampened screen value is added to a value equal to $255-V_i$, the video value, so as to produce a hybrid transformed video value of $(255-V_i)+(S_i-128) * Dmp_{vi}$.

The dampening values can be programmable such that the input video is simply used to address a random access memory lookup table wherein the values stored within the lookup table range from 0.0 to 1.0. However, it is further noted, that to conserve memory space, a smaller random access memory lookup table can be utilized wherein this lookup table is programmed only for input grey levels from 0 through 15 and 240 through 255. The dampening value for input grey levels of 16 through 239 would remain at 1.0 (no dampening).

Moreover, the dampening values between 0 and 15 and 240 and 255 may represent a linear function from 0% to 100%. In other words, each increment in video value corresponds to an increment of 6.25% in modulation in the range from 0 to 15 and a decrease of 6.25% in the range of 240 to 255.

Figure 29:
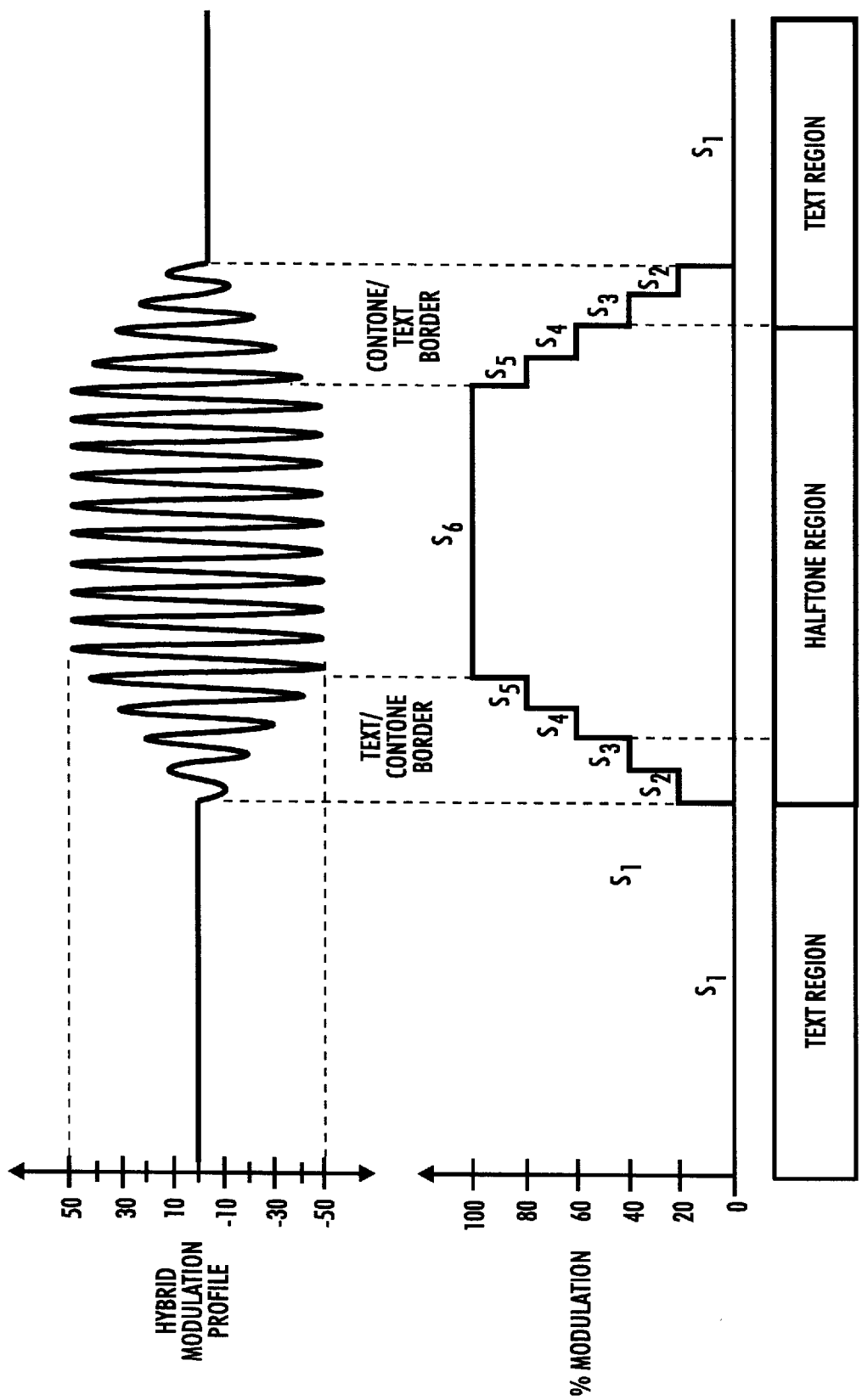
FIG. 29 shows a graphical representation of a hybrid modulation profile with respect to image type according to the aspects of the present invention.

Another problem associated with hybrid image processing is the rendering of images at the transition between two distinct segmented regions. To resolve this problem, the screening process applies certain modulation levels and utilizes the same screen in areas where one segmented region is transitioning to another segmented region. For example, as illustrated in FIG. 29, during the transition from a region labeled as text into a region designated as halftone, a screen having a 0% modulation is applied in the text region. Thereafter, prior to encountering the halftone region but within a text/halftone border, the present invention slowly increases the modulation level in 20% increments until the modulation level reaches 100% in the halftone region.

Figure 30:
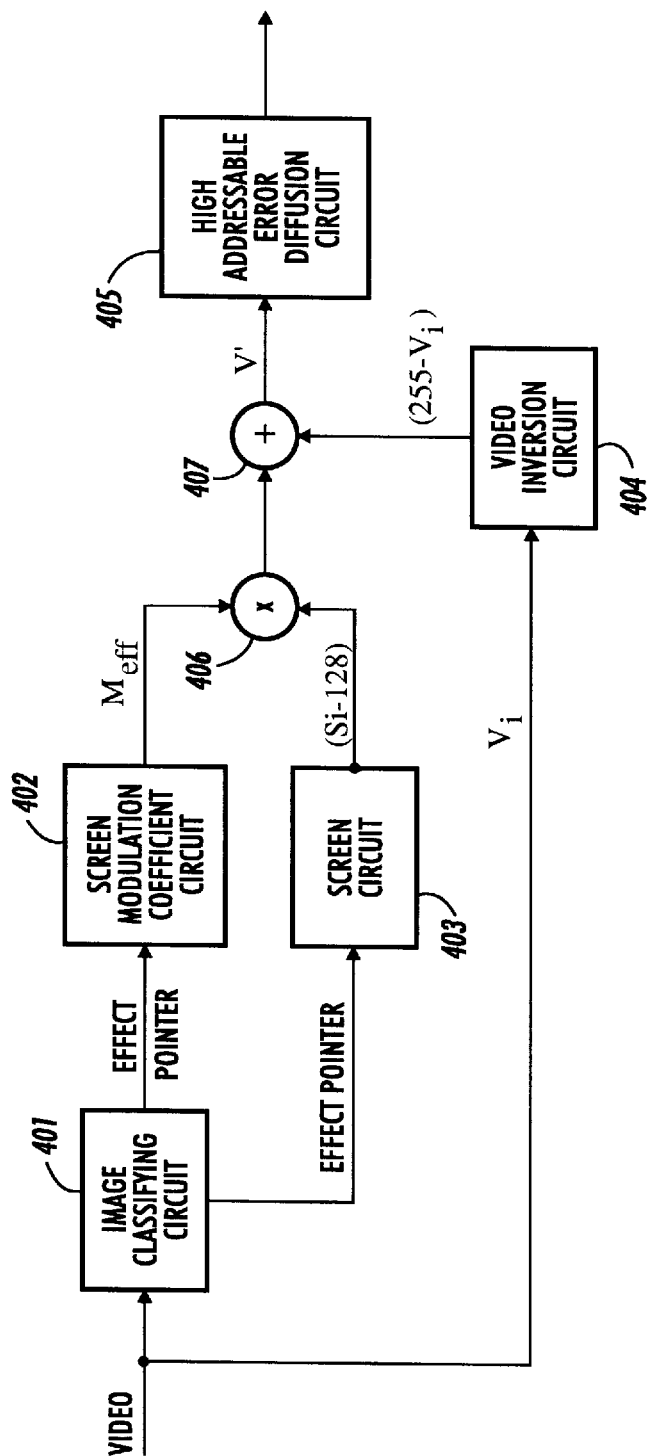
FIG. 30 shows a block diagram illustrating a modulation multiplication factor video signal circuit.

FIG. 30 is a block diagram illustrating a hardware implementation of the modulation modification process as illustrated in FIG. 29. As illustrated in FIG. 30, the video signal is fed into an image classifying circuit 401 which may be any conventional image segmentation or auto segmentation circuit. The image classifying circuit 401 produces an effect pointer which describes the classification of the pixel associated with the video signal. The effect pointer contains information that instructs the downstream image processing modules as to how to process the video data.

The effect pointer information produced by image classifying circuit 401 is fed into a screen modulation coefficient circuit 402 and a screen circuit 403. The screen circuit 403 determines the exact screen to be applied to the image based upon the effect pointer. The screen may be a particular screen for producing a contone image or maybe a constant screen for rendering text or line art image. The exact screen value that is selected from the screen is based on the position of the video (pixel) within the video stream. The output from screen circuit 403 ($S_i$−128) is fed into multiplier 406. In parallel to this process, the screen modulation coefficient circuit 402 determines the modulation multiplication factor $M_{eff}$ based upon the effect pointer value.

The screen value from the screen circuit 403 and the modulation multiplication factor $M_{eff}$ from the screen modulation coefficient circuit 402 are fed into multiplier 406 to produce the modified screened signal $(S_i+Th)*M_{eff}$ which is then fed into adder 407 to produce the modified screened video signal $V_s'=(255-V_i)+(S_i-Th)*M_{eff}$. The modified screen signal is fed to a high addressable error diffusion circuit 405 for further processing.

In summary, the amount of modulation for screening needs to be controlled for both the elimination of border and subpixel artifacts and to avoid the problems which occur at transitions between segmented regions. As noted above, the screen amplitude can also be adjusted by the dampening factor, $Dmp_{vi}$, to eliminate the border and background subpixel artifacts which may be present when applying 100% modulation. Moreover, as noted above, the screen amplitude can also be adjusted to take into account the transition areas between segmented regions. Thus, to resolve both situations, a hybrid transformation equal to $V'=(255-V_i)+(S_i-128) * Dmp_{vi} * Mod_{eff}$ is used where $Mod_{eff}$ is the modulation multiplication factor based upon effect pointers and $Dmp_{vi}$ is the dampening factor based on the image density of the video signal.

By utilizing this hybrid processing transformation, the present invention can effectively modulate the screening process without switching separate screens. More specifically, the same screen is utilized throughout the transition period, but the modulation multiplication factor is changed in order to realize the proper modulation. In the preferred embodiment of the present invention, the modulation multiplication factor enables the present invention to use up to 17 different modulation multiplication factors ranging from 0.0 to 1.0 in 0.0625 increments.

Figure 31:
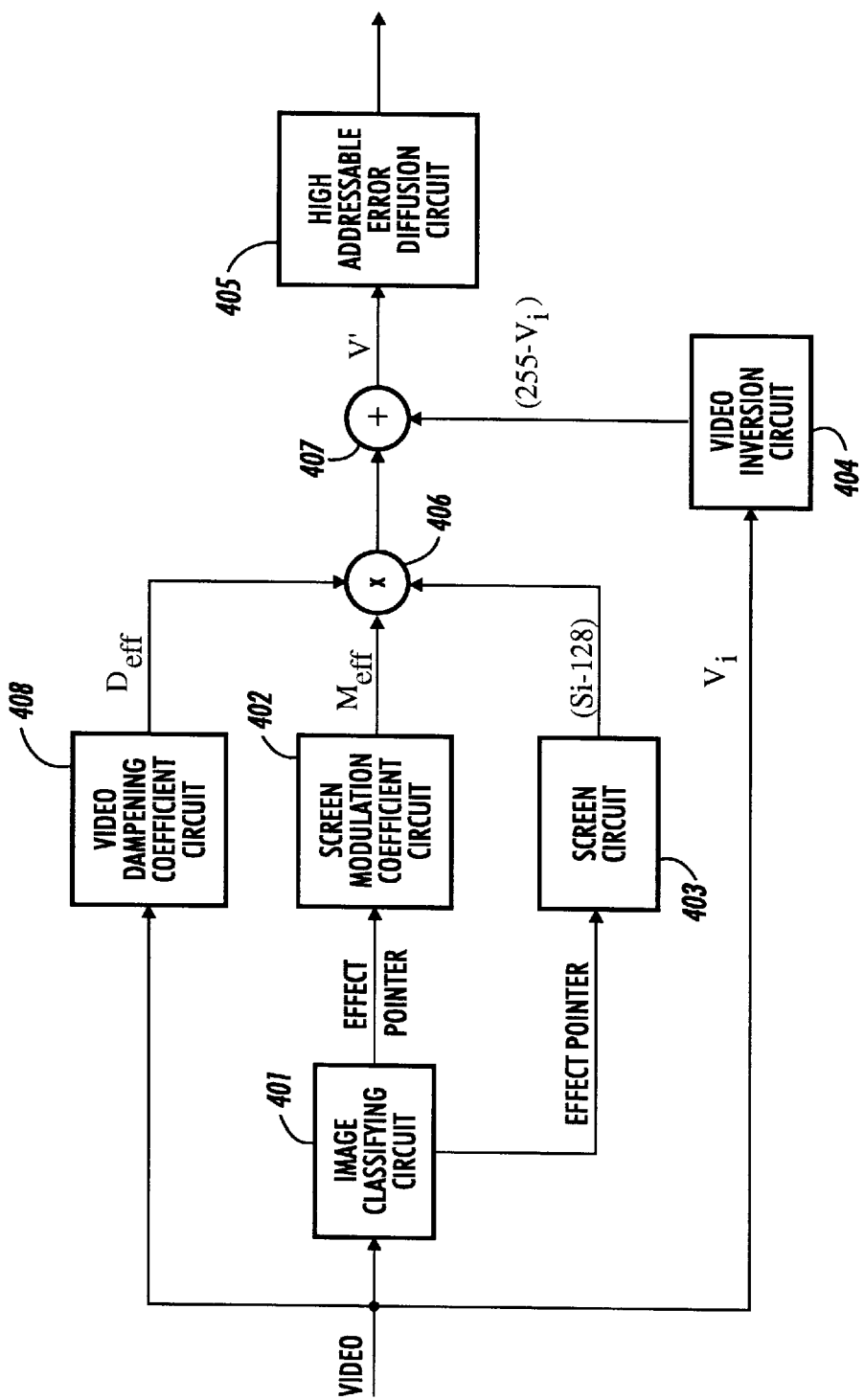
FIG. 31 shows a block diagram illustrating a modulation multiplication factor and video dampening signal circuit.

FIG. 31 illustrates a block diagram of one embodiment of hardware implementing the hybrid video transformation process of the present invention. As illustrated in FIG. 31, the video signal is fed into an image classifying circuit 401 which may be any conventional image segmentation or auto segmentation circuit. The image classifying circuit 401 produces an effect pointer which describes the classification of the pixel associated with the video signal that is being processed. The effect pointer contains information that instructs the downstream image processing modules as to how to process the pixel of video data.

The effect pointer information produced by image classifying circuit 401 is fed into a screen modulation coefficient circuit 402 and a screen circuit 403. The screen circuit 403 determines the exact screen to be applied to the image based upon the effect pointer. The screen may be a particular screen for producing a contone image or maybe a constant screen for rendering text or line art image. The exact screen value that is selected from the screen is based on the position of the video (pixel) within the video stream. The output from screen circuit 403 ($S_i$−128) is fed into multiplier 406. In parallel to this process, the screen modulation coefficient circuit 402 determines the modulation multiplication factor $M_{eff}$ based upon the effect pointer value. In parallel to the two above described processes, a video dampening coefficient circuit 408 is generating the dampening value $D_{eff}$. The generation of this value is dependent upon the value of the video signal.

The screen value from the screen circuit 403, the modulation multiplication factor $M_{eff}$ from the screen modulation coefficient circuit 402, and the dampening value $D_{eff}$ from video dampening coefficient circuit 408 are fed into multiplier 406 to produce the modified screened signal $(S_i+Th)*D_{eff}*M_{eff}$ which is then fed into adder 407 to produce the modified screened video signal $V_s'=(255-V_i)+(S_i+Th)*D_{eff}*M_{eff}$. The modified screen signal is fed to a high addressable error diffusion circuit 405 for further processing.

Figure 33:
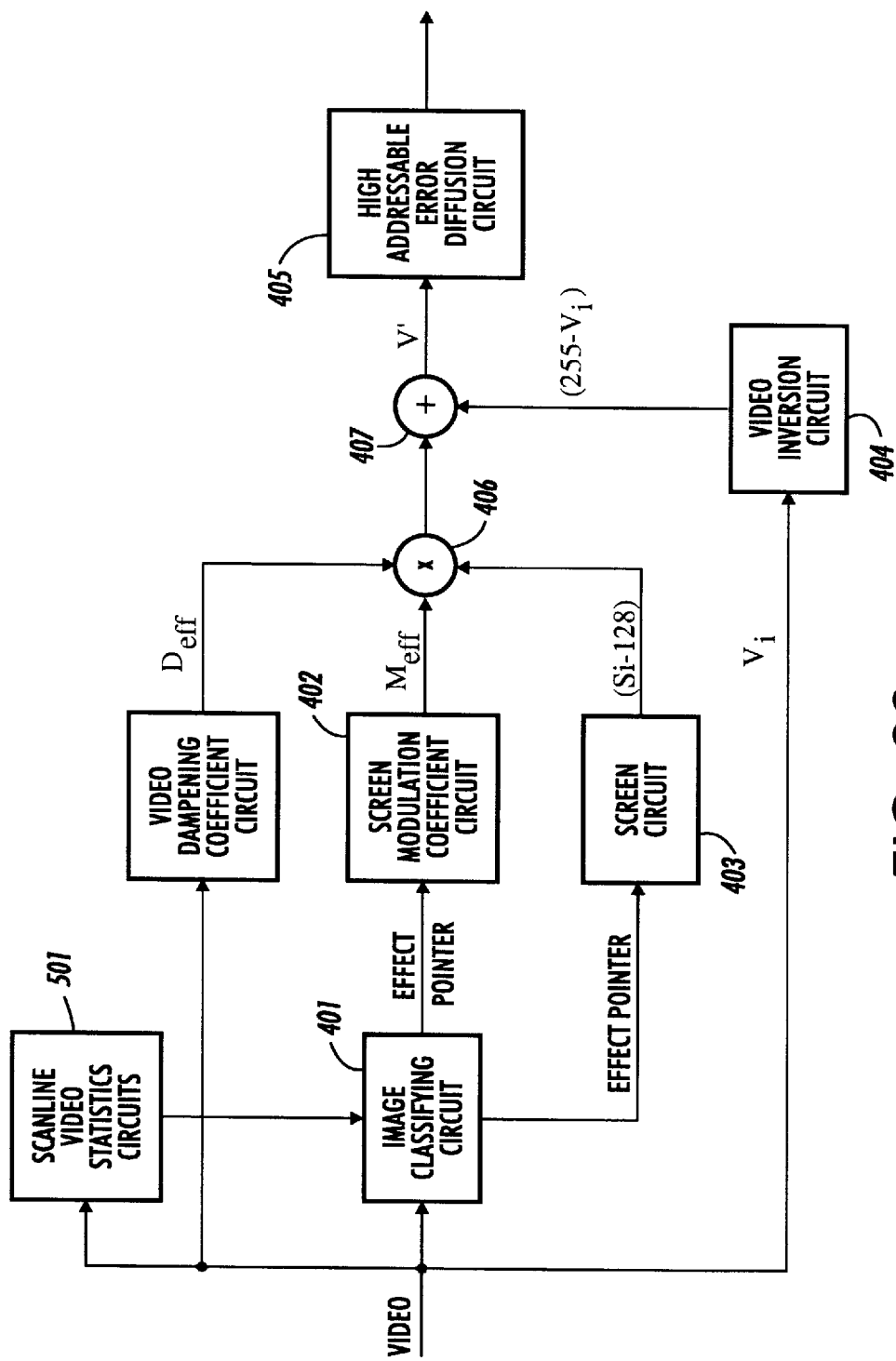
FIG. 33 illustrates a block diagram of another embodiment of the present invention.
Figure 34:
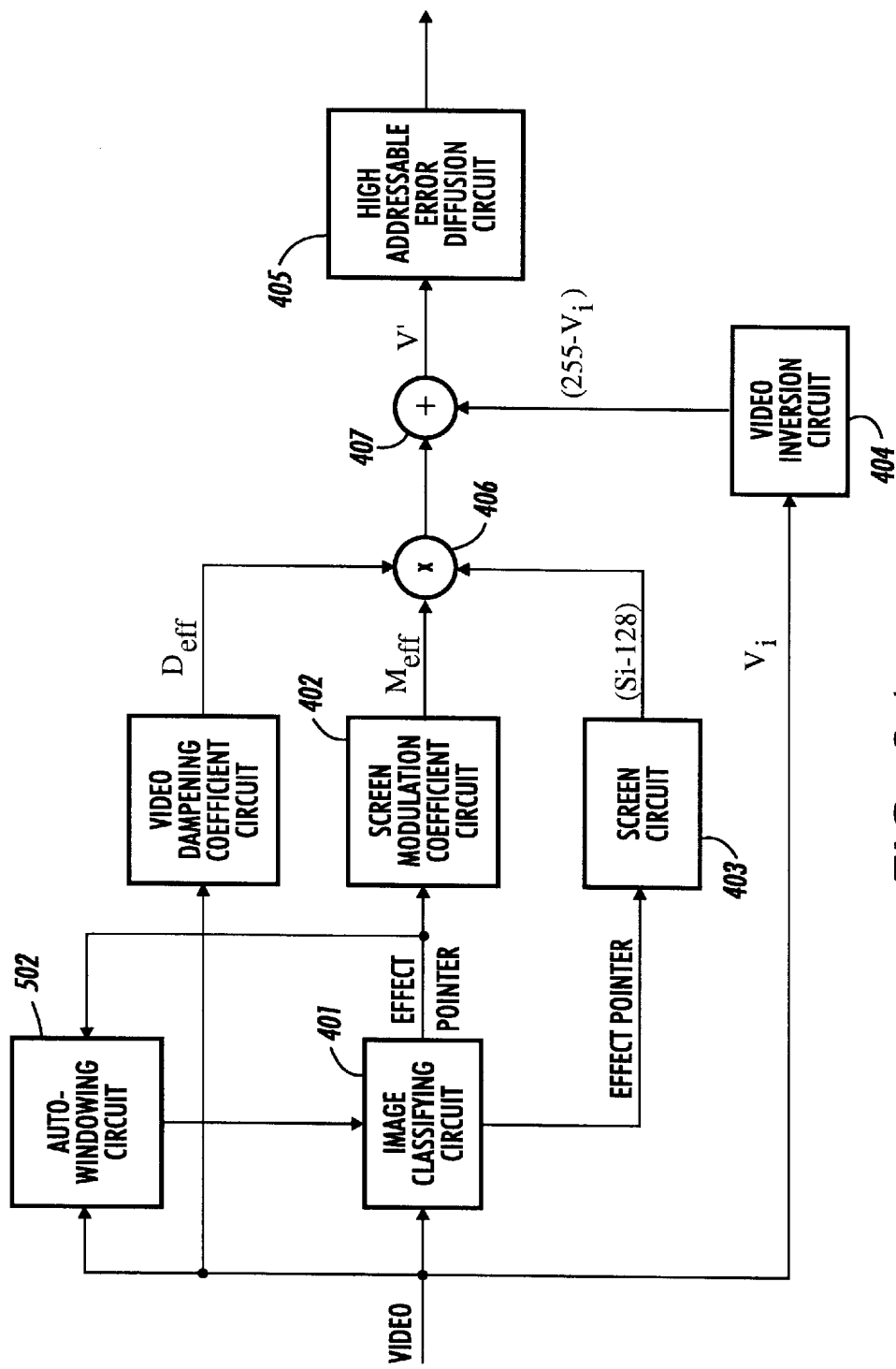
FIG. 34 illustrates a block diagram of a third embodiment of the present invention.

Although the above noted processes address the problems with border and segmentation transitions, the above described screening process does not adequately avoid the problems associated with a user adjusting the brightness/darkness settings. More specifically, the number of available grey levels per halftone cell still needs to be increased to faithfully reproduce an image whose brightness/darkness parameter has be modified by the user. Solution to this problem are illustrated in FIGS. 32–34.

Figure 32:
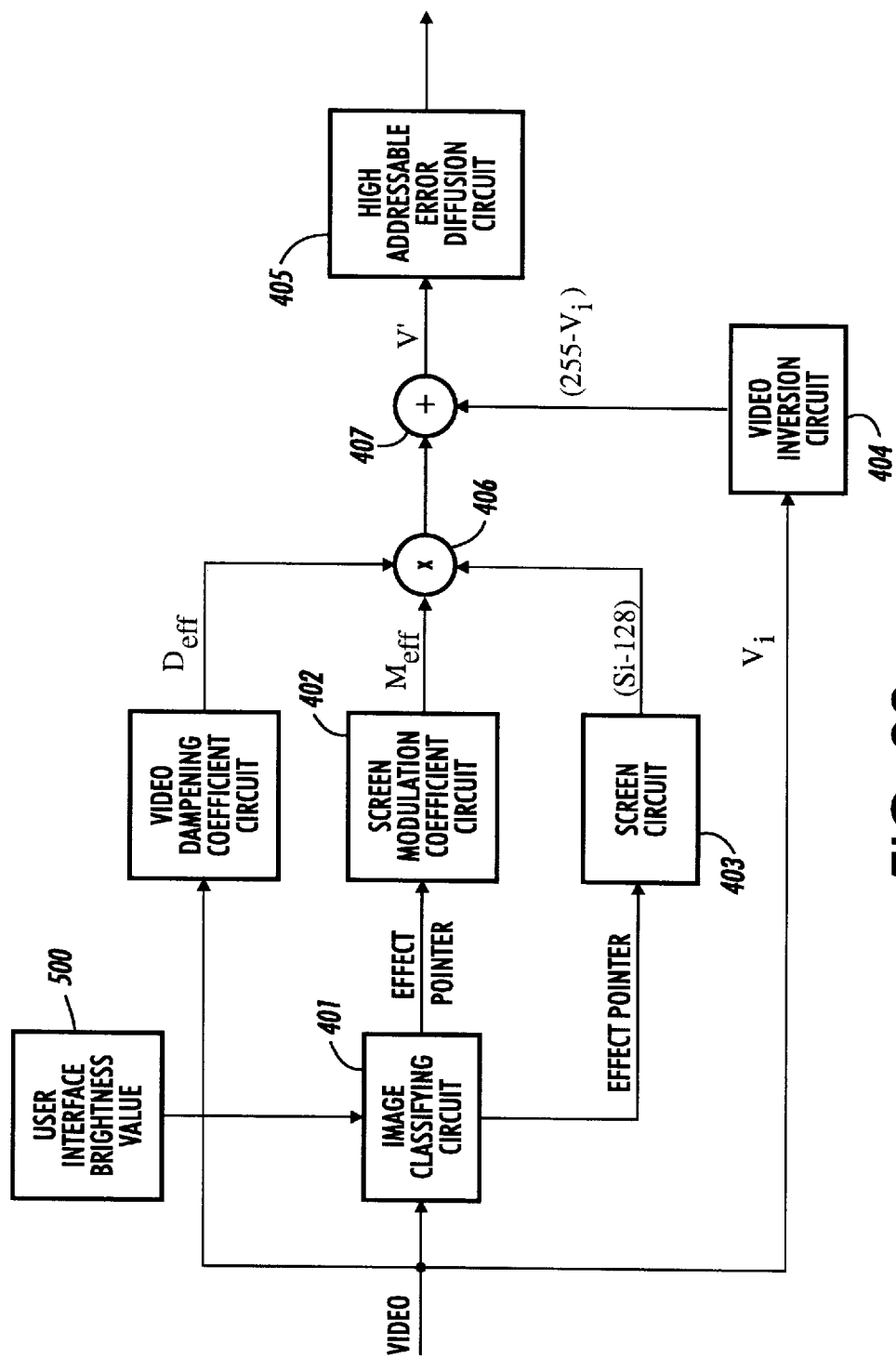
FIG. 32 illustrates a block diagram of one embodiment of the present invention.

In FIG. 32, a video signal is fed into an image classifying circuit 401 which initially classifies the pixel of image data according a set of image types; i.e., text, contone, high frequency halftone, low frequency halftone, etc. The image classifying circuit 401 also receives, from a user interface 500, a value indicating the brightness/darkness setting chosen by the user. This brightness/darkness setting value and the image type classification information are used to generate an effect pointer which describes the classification of the pixel associated with the video signal that is being processed. The effect pointer contains information that instructs the downstream image processing modules as to how to process the pixel of video data.

The effect pointer information produced by image classifying circuit 401 is fed into a screen modulation coefficient circuit 402 and a screen circuit 403. The screen circuit 403 determines the exact screen to be applied to the image based upon the effect pointer. In the preferred embodiment of the present invention, the screen circuit is a look-up table having a particular screen for each image classification based on a normal brightness/darkness setting (a setting of zero). For example, the screen circuit 403 may have stored therein a particular screen (screen A) for producing a contone image when the brightness/darkness setting is zero or maybe a constant screen for rendering text or line art image when the brightness/darkness setting is zero.

Moreover, the screen circuit 403 includes variants of these screens which are associated with the possible brightness/darkness values. For example, if the possible brightness/darkness values were +2, +1, 0, −1, and −2, the screen circuit 403 could have four variants of the constant screen when rendering text or line art. A further example is if the possible brightness/darkness values were +2, +1, 0, −1, and −2, the screen circuit 403 could have four variants of screen A when rendering a contone image. In other words, the screen circuit would have the basic screens stored therein for rendering specific image classes and also have stored therein variants of these screens which are optimized for certain brightness/darkness settings. By using a different screen depending upon the brightness/darkness setting, the present invention can maximize the number of grey levels available per halftone cell, and thus, enable a faithful rendering of an image with respect to the chosen brightness/darkness setting.

The screen is selected based on the effect pointer which includes information as to the basic screen (based on image classification) to be used and/or which variant thereof (based on brightness/darkness setting). The exact screen value that is selected from the selected screen is based on the position of the video (pixel) within the video stream.

The output from screen circuit 403 ($S_i$−128) is fed into multiplier 406. In parallel to this process, the screen modulation coefficient circuit 402 determines the modulation multiplication factor $M_{eff}$ based upon the effect pointer value. In parallel to the two above described processes, a video dampening coefficient circuit 408 is generating the dampening value $D_{eff}$. The generation of this value is dependent upon the value of the video signal.

The screen value from the screen circuit 403, the modulation multiplication factor $M_{eff}$ from the screen modulation coefficient circuit 402, and the dampening value $D_{eff}$ from video dampening coefficient circuit 408 are fed into multiplier 406 to produce the modified screened signal ($S_i$+Th)*$D_{eff}$*$M_{eff}$ which is then fed into adder 407 to produce the modified screened video signal $V_s'$=(255−$V_i$)+($S_i$+Th)*$D_{eff}$*$M_{eff}$. The modified screen signal is fed to a high addressable error diffusion circuit 405 for further processing.

By utilizing the above described dynamic screening hybrid method as illustrated in FIG. 32, the present invention is capable of maintaining a high number of grey levels available for each halftone cell, notwithstanding the brightness/darkness setting while also utilizing the full dynamic range of the hybrid image processing operations. Also, since the screen value is dynamically changed based on the value of the effect pointer, the screen value can be dynamically adjusted, thereby adjusting the brightness/darkness characteristic of the image, on a localized basis because the effect pointer is generated on a pixel-by-pixel basis. This makes it possible for the present invention to correct any background non-uniformity associated with some documents, especially old documents. One example is an engineering document which may have a non-clean background of blue lines, blue print, etc. The present invention can remove the non-uniformity using the adaptive techniques described above and the histogram is generated on a more localized basis.

In FIG. 33, a video signal is fed into an image classifying circuit 401 which initially classifies the pixel of image data according a set of image types; i.e., text, contone, high frequency halftone, low frequency halftone, etc.; and a scanline video statistics circuit 501. The image classifying circuit 401 also receives, from the scanline video statistics circuit 501, a value indicating the brightness/darkness value based upon image statistics (histogram) collected from the video as the document is being scanned but without user interaction. Basing the brightness/darkness settings on these statistics, this embodiment of the present invention can compensate for variations in the document's background. The value generated by the scanline video statistics circuit 501 would be dynamic in the sense that it would adjust the brightness/darkness settings on a scanline-by-scanline basis. This brightness/darkness setting value and the image type classification information are used to generate an effect pointer which describes the classification of the pixel associated with the video signal that is being processed. The effect pointer contains information that instructs the downstream image processing modules as to how to process the pixel of video data.

The effect pointer information produced by image classifying circuit 401 is fed into a screen modulation coefficient circuit 402 and a screen circuit 403. The screen circuit 403 determines the exact screen to be applied to the image based upon the effect pointer. In the preferred embodiment of the present invention, the screen circuit is a look-up table having a particular screen for each image classification based on a normal brightness/darkness setting (a setting of zero). For example, the screen circuit 403 may have stored therein a particular screen (screen A) for producing a contone image when the brightness/darkness setting is zero or maybe a constant screen for rendering text or line art image when the brightness/darkness setting is zero.

Moreover, the screen circuit 403 includes variants of these screens which are associated with the possible brightness/darkness values. For example, if the possible brightness/darkness values were +2, +1, 0, −1, and −2, the screen circuit 403 could have four variants of the constant screen when rendering text or line art. A further example is if the possible brightness/darkness values were +2, +1, 0, −1, and −2, the screen circuit 403 could have four variants of screen A when rendering a contone image. In other words, the screen circuit would have the basic screens stored therein for rendering specific image classes and also have stored therein variants of these screens which are optimized for certain brightness/darkness settings. By using a different screen depending upon the brightness/darkness setting, the present invention can maximize the number of grey levels available per halftone cell, and thus, enable a faithful rendering of an image with respect to the chosen brightness/darkness setting.

The screen is selected based on the effect pointer which includes information as to the basic screen (based on image classification) to be used and/or which variant thereof (based on brightness/darkness setting). The exact screen value that is selected from the selected screen is based on the position of the video (pixel) within the video stream.

The output from screen circuit 403 ($S_i$−128) is fed into multiplier 406. In parallel to this process, the screen modulation coefficient circuit 402 determines the modulation multiplication factor $M_{eff}$ based upon the effect pointer value. In parallel to the two above described processes, a video dampening coefficient circuit 408 is generating the dampening value $D_{eff}$. The generation of this value is dependent upon the value of the video signal.

The screen value from the screen circuit 403, the modulation multiplication factor $M_{eff}$ from the screen modulation coefficient circuit 402, and the dampening value $D_{eff}$ from video dampening coefficient circuit 408 are fed into multiplier 406 to produce the modified screened signal ($S_i$+Th)*$D_{eff}$*$M_{eff}$ which is then fed into adder 407 to produce the modified screened video signal $V_s'$=(255−$V_i$)+($S_i$+Th)*$D_{eff}$*$M_{eff}$. The modified screen signal is fed to a high addressable error diffusion circuit 405 for further processing.

By utilizing the above described dynamic screening hybrid method as illustrated in FIG. 33, the present invention is capable of maintaining a high number of grey levels available for each halftone cell, notwithstanding the brightness/darkness setting while also utilizing the full dynamic range of the hybrid image processing operations.

FIG. 34 illustrates the situation where a two-pass scanning process is being used to scan the image. In other words FIG. 34 illustrates a two-pass auto-windowing environment, where the entire is windowed object can be classified as text, halftone, contone, etc., and in addition, along with the histogram information for that object/window, can generate the appropriate window brightness/darkness settings. This situation would be dynamic in the sense that the brightness/darkness settings are adjusted on a window-by-window basis for each object on the page but without the user interaction.

In FIG. 34, a video signal is fed into an image classifying circuit 401 which initially classifies the pixel of image data according a set of image types; i.e., text, contone, high frequency halftone, low frequency halftone, etc.; and an auto-windowing circuit 502. The image classifying circuit 401 also receives, from the auto-windowing circuit 502 a user interface 500, a value indicating the brightness/darkness setting based on the histogram of the image. Auto-windowing circuit 502 receives input from circuit 401 during the first pass and then sends information back to circuit 401 during the time between first and second pass (each pass corresponding to a full scan of the image by the scanning unit). This enables circuit 401 to distinctly apply a brightness/darkness factor to each windowed object, if so desired. Note also that auto-windowing circuit 502 also receives information directly from the video so as to collect the entire window/object histogram profile.

The brightness/darkness setting value and the image type classification information are used to generate an effect pointer which describes the classification of the pixel associated with the video signal that is being processed. The effect pointer contains information that instructs the downstream image processing modules as to how to process the pixel of video data.

The effect pointer information produced by image classifying circuit 401 is fed into a screen modulation coefficient circuit 402 and a screen circuit 403. The screen circuit 403 determines the exact screen to be applied to the image based upon the effect pointer. In the preferred embodiment of the present invention, the screen circuit is a look-up table having a particular screen for each image classification based on a normal brightness/darkness setting (a setting of zero). For example, the screen circuit 403 may have stored therein a particular screen (screen A) for producing a contone image when the brightness/darkness setting is zero or maybe a constant screen for rendering text or line art image when the brightness/darkness setting is zero.

Moreover, the screen circuit 403 includes variants of these screens which are associated with the possible brightness/darkness values. For example, if the possible brightness/darkness values were +2, +1, 0, −1, and −2, the screen circuit 403 could have four variants of the constant screen when rendering text or line art. A further example is if the possible brightness/darkness values were +2, +1, 0, −1, and −2, the screen circuit 403 could have four variants of screen A when rendering a contone image. In other words, the screen circuit would have the basic screens stored therein for rendering specific image classes and also have stored therein variants of these screens which are optimized for certain brightness/darkness settings. By using a different screen depending upon the brightness/darkness setting, the present invention can maximize the number of grey levels available per halftone cell, and thus, enable a faithful rendering of an image with respect to the chosen brightness/darkness setting.

The screen is selected based on the effect pointer which includes information as to the basic screen (based on image classification) to be used and/or which variant thereof (based on brightness/darkness setting). The exact screen value that is selected from the selected screen is based on the position of the video (pixel) within the video stream.

The output from screen circuit 403 ($S_i$−128) is fed into multiplier 406. In parallel to this process, the screen modulation coefficient circuit 402 determines the modulation multiplication factor $M_{eff}$ based upon the effect pointer value. In parallel to the two above described processes, a video dampening coefficient circuit 408 is generating the dampening value $D_{eff}$. The generation of this value is dependent upon the value of the video signal.

The screen value from the screen circuit 403, the modulation multiplication factor $M_{eff}$ from the screen modulation coefficient circuit 402, and the dampening value $D_{eff}$ from video dampening coefficient circuit 408 are fed into multiplier 406 to produce the modified screened signal $(S_i+\text{Th})$ $*D_{eff}*M_{eff}$ which is then fed into adder 407 to produce the modified screened video signal $V_s'=(255-V_i)+(S_i+\text{Th})*D_{eff}*N_{eff}$. The modified screen signal is fed to a high addressable error diffusion circuit 405 for further processing.

By utilizing the above described dynamic screening hybrid method as illustrated in FIG. 34, the present invention is capable of maintaining a high number of grey levels available for each halftone cell notwithstanding the brightness/darkness setting while also utilizing the full dynamic range of the hybrid image processing operations.

In describing the present invention, the terms pixel and subpixel have been utilized. These terms may refer to an electrical (or optical, if fiber optics are used) signal which represent the physically measurable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

Although the present invention has been described in detail above, various modifications can be implemented without departing from the spirit of the present invention. For example, the preferred embodiment of the present invention has been described with respect to a printing system; however, this screening/error diffusion method is readily implemented in a display system. Moreover, the screening and high addressability error diffusion method of the present invention can be readily implemented on an ASIC, programmable gate array, or in software, thereby enabling the placement of this process in a scanner, electronic subsystem, printer, or display device.

Moreover, various examples of the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level output terminal or higher.

Lastly, the present invention has been described with respect to a monochrome or black/white environment. However, the concepts of the present invention are readily applicable to a color environment. Namely, screening and high addressability error diffusion process of the present invention can be applied to each color space value representing the color pixel.

While the present invention has been described with reference to various embodiments disclosed herein before, it is not to be combined to the detail set forth above, but is intended to cover such modifications or changes as made within the scope of the attached claims.

What is claimed is:

1. A method of reducing a number of levels in a multi-level grey scale pixel value representing a pixel and diffusing an error generated from reducing the number of levels, comprising the steps of:
    (a) receiving a multi-level grey scale pixel value representing a pixel having a first resolution;
    (b) receiving a brightness/darkness setting value;
    (c) generating an effect pointer based on an image type of the received multi-level grey scale pixel and a window of pixels surrounding the multi-level grey scale pixel and the brightness/darkness setting value;
    (d) selecting, from a plurality of screens, a screen according to the effect pointer;
    (e) generating a screen value from the selected screen dependent upon a position of the received pixel;
    (f) generating a screened multi-level grey scale pixel value utilizing the screen value;
    (g) reducing the number of levels in the screened multi-level grey scale pixel value;
    (h) generating an error value as a result of the reduction process in said step (g); and
    (i) diffusing the error value to multi-level grey scale pixel values of adjacent pixels.

2. The method as claimed in claim 1, further comprising the step of:
    (j) converting the screened multi-level grey scale pixel value to a second resolution prior to the execution of said step (g), the second resolution being higher than the first resolution;
said step (h) generating an error value having a resolution corresponding to the first resolution.

3. The method as claimed in claim 2, wherein said step (j) comprises the substeps of:
    (j1) computing a first multi-level grey scale pixel value; and
    (j2) computing a second multi-level grey scale pixel value.

4. The method as claimed in claim 3, wherein said step (j) comprises the substep of:
    (j3) computing a plurality of multi-level grey scale sub-pixel values $B_n$, the multi-level grey scale subpixel values $B_n$ being equal to P0+n(P1−P0)/N, wherein n is equal to 0 to N−1, P0 is equal to the first multi-level grey scale pixel value, P1 is equal to the second multi-level grey scale pixel value, and N is equal to a high addressability characteristic.

5. The method as claimed in claim 4, wherein said step (h) comprises the substeps of:
    (h1) calculating a desired output, the desired output being equal to a sum of the first and second multi-level grey scale pixel values divided by two;
    (h2) calculating an actual output, the actual output being equal to the number of subpixels being equal to or greater than a threshold value multiplied by a difference between a black reference value and a white reference value divided by a high addressability characteristic; and
    (h3) calculating the error value to be equal to the desired output minus the actual output.

6. The method as claimed in claim 1, further comprising the steps of:
    (j) generating a modulation multiplication factor based on the effect pointer, the modulation multiplication factor being based on image classification; and
    (k) modifying the screen value by the modulation multiplication factor;
said step (f) generating a screened multi-level grey scale pixel value utilizing the modulation multiplication factor modified screen value.

7. The method as claimed in claim 6, wherein the screened multi-level grey scale pixel value is equal to $((S_i+G_L-V_i)/2) * M$ wherein Si is equal to the screen value, $G_L$ is equal to a maximum grey level value for a pixel, Vi is equal to the received multi-level grey scale pixel value, and M is equal to the modulation multiplication factor.

8. The method as claimed in claim 6, wherein the screened multi-level grey scale pixel value is equal to $(G_L-V_i)+(S_i-Th) * M$ wherein $S_i$ is equal to the screen value, $G_L$ is equal to a maximum grey level value for a pixel $V_i$ is equal to the received multi-level grey scale pixel value, Th is a threshold value, and M is equal to the modulation multiplication factor.

9. The method as claimed in claim 6, further comprising the steps of:
    (l) generating a dampening screen weight based on the multi-level grey scale pixel value; and
    (m) further modifying the screen value based on the generated dampening screen weight;
said step (f) generating a screened multi-level grey scale pixel value utilizing the modulation multiplication factor and dampening screen weight modified screen value.

10. The method as claimed in claim 9, wherein the screened multi-level grey scale pixel value is equal to $(S_i+G_L-V_i)/2)*D*M$ wherein $S_i$ is equal to the screen value, $G_L$ is equal to a maximum grey level value for a pixel, $V_i$ is equal to the received multi-level grey scale pixel value, D is the dampening screen weight, and M is equal to the modulation multiplication factor.

11. The method as claimed in claim 9, wherein the screened multi-level grey scale pixel value is equal to $(G_L-V_i)+(S_i-Th)*D*M$ wherein $S_i$ is equal to the screen value, $G_L$ is equal to a maximum grey level value for a pixel $V_i$ is equal to the received multi-level grey scale pixel value, Th is a threshold value, D is the dampening screen weight, and M is equal to the modulation multiplication factor.

12. The method as claimed in claim 1, wherein the brightness/darkness setting value is generated by a user.

13. The method as claimed in claim 1, wherein the brightness/darkness setting value is generated by a scanline video statistic circuit.

14. The method as claimed in claim 1, wherein the brightness/darkness setting value is generated by an auto-windowing circuit.

15. A system for reducing a number of levels in a multi-level grey scale pixel value representing a pixel and diffusing an error generated from reducing the number of levels, comprising:
   means for generating a brightness/darkness setting value;
   image segmentation means for generating an effect pointer based on an image type of a multi-level grey scale pixel to be processed and a window of pixels surrounding the multi-level grey scale pixel and the generated brightness/darkness setting value;
   screen means for selecting, from a plurality of screens, a screen according to the effect pointer and generating a screen value from the selected screen dependent upon a position of the pixel to be processed;
   modifying means for generating a screened multi-level grey scale pixel value utilizing the screen value;
   threshold means for reducing the number of levels in the screened multi-level grey scale pixel value; and
   error means for generating an error value as a result of the reduction process by said threshold means and diffusing the error value to multi-level grey scale pixel values of adjacent pixels.

16. The system as claimed in claim 15, further comprising:
   converting means for converting the screened multi-level grey scale pixel value to a second resolution prior to the reduction process by said threshold means, the second resolution being higher than the first resolution;
   said error means generating an error value having a resolution corresponding to the first resolution.

17. The system as claimed in claim 16, wherein said converting means computes a plurality of multi-level grey scale subpixel values $B_n$, the multi-level grey scale subpixel values $B_n$ being equal to $P0+n(P1-P0)/N$, wherein n is equal to 0 to N−1, P0 is equal to the first multi-level grey scale pixel value, P1 is equal to the second multi-level grey scale pixel value, and N is equal to a high addressability characteristic.

18. The system as claimed in claim 15, further comprising:
   modulation means for generating a modulation multiplication factor based on the effect pointer, the modulation multiplication factor being based on image classification; and
   means for modifying the screen value by the modulation multiplication factor;
   said modifying means generating a screened multi-level grey scale pixel value utilizing the modulation multiplication factor modified screen value.

19. The system as claimed in claim 18, further comprising:
   dampening means for generating a dampening screen weight based on the multi-level grey scale pixel value; and
   said means for modifying further modifying the screen value based on the generated dampening screen weight;
   said modifying means generating a screened multi-level grey scale pixel value utilizing the modulation multiplication factor and dampening screen weight modified screen value.

20. The system as claimed in claim 15, wherein said means for generating the brightness/darkness setting value is a user interface.

21. The system as claimed in claim 15, wherein said means for generating the brightness/darkness setting value is a scanline video statistic circuit.

22. The system as claimed in claim 15, wherein said means for generating the brightness/darkness setting value is an auto-windowing circuit.

23. A system for reducing a number of levels in a multi-level grey scale pixel value representing a pixel and diffusing an error generated from reducing the number of levels, comprising:
   a brightness/darkness circuit to generate a brightness/darkness setting value;
   an image segmentation circuit to generate an effect pointer based on an image type of a multi-level grey scale pixel to be processed and a window of pixels surrounding the multi-level grey scale pixel and the generated brightness/darkness setting value;
   a screen circuit, including a look-up table, to select, from a plurality of screens, a screen according to the effect pointer and generating a screen value from the selected screen dependent upon a position of the pixel to be processed;
   an adder to generate a screened multi-level grey scale pixel value with the screen value;
   a threshold circuit to reduce the number of levels in the screened multi-level grey scale pixel value; and
   an error diffusion circuit to generate an error value as a result of the reduction process and diffuse the error value to multi-level grey scale pixel values of adjacent pixels.

24. The system as claimed in claim 23, further comprising:
   converting means for converting the screened multi-level grey scale pixel value to a second resolution prior to the reduction process by said threshold means, the second resolution being higher than the first resolution;
   said error means generating an error value having a resolution corresponding to the first resolution.

25. The system as claimed in claim 23, further comprising:
   modulation means for generating a modulation multiplication factor based on the effect pointer, the modulation multiplication factor being based on image classification; and
   modifying means for modifying the screen value by the modulation multiplication factor;
   said adder generating a screened multi-level grey scale pixel value utilizing the modulation multiplication factor modified screen value.

26. The system as claimed in claim 25, further comprising:
   dampening means for generating a dampening screen weight based on the multi-level grey scale pixel value; and
   said modifying means further modifying the screen value based on the generated dampening screen weight;
   said adder generating a screened multi-level grey scale pixel value utilizing the modulation multiplication factor and dampening screen weight modified screen value.

27. The system as claimed in claim 23, wherein said brightness/darkness circuit is a user interface.

28. The system as claimed in claim 23, wherein said brightness/darkness circuit is a scanline video statistic circuit.

29. The system as claimed in claim 23, wherein said brightness/darkness circuit is an auto-windowing circuit.

30. A method of screening a multi-level grey scale pixel value representing a pixel, comprising the steps of:

(a) receiving a multi-level grey scale pixel value representing a pixel;

(b) receiving a brightness/darkness setting value;

(c) generating an effect pointer based on an image type of the received multi-level grey scale pixel and the brightness/darkness setting value;

(d) selecting, from a plurality of screens, a screen according to the effect pointer;

(e) generating a screen value from the selected screen dependent upon a position of the received pixel; and (f) generating a screened multi-level grey scale pixel value utilizing the screen value.

31. The method as claimed in claim 30, further comprising the steps of:

(g) generating a modulation multiplication factor based on the effect pointer, the modulation multiplication factor being based on image classification; and (h) modifying the screen value by the modulation multiplication factor;

said step (f) generating a screened multi-level grey scale pixel value utilizing the modulation multiplication factor modified screen value.

32. The method as claimed in claim 31, wherein the screened multi-level grey scale pixel value is equal to $((S_i+G_L-V_i)/2) * M$ wherein Si is equal to the screen value, $G_L$ is equal to a maximum grey level value for a pixel, Vi is equal to the received multi-level grey scale pixel value, and M is equal to the modulation multiplication factor.

33. The method as claimed in claim 31, further comprising the steps of:

(i) generating a dampening screen weight based on the multi-level grey scale pixel value; and (j) further modifying the screen value based on the generated dampening screen weight;

said step (f) generating a screened multi-level grey scale pixel value utilizing the modulation multiplication factor and dampening screen weight modified screen value.

34. The method as claimed in claim 33, wherein the screened multi-level grey scale pixel value is equal to $(S_i+G_L-V_i)/2)*D* M$ wherein $S_i$ is equal to the screen value, $G_L$ is equal to a maximum grey level value for a pixel, $V_i$ is equal to the received multi-level grey scale pixel value, D is the dampening screen weight, and M is equal to the modulation multiplication factor.

35. The method as claimed in claim 30, wherein the brightness/darkness setting value is generated by a user.

36. The method as claimed in claim 30, wherein the brightness/darkness setting value is generated by a scanline video statistic circuit.

37. The method as claimed in claim 30, wherein the brightness/darkness setting value is generated by an auto-windowing circuit.

38. A system for screening a multi-level grey scale pixel value representing a pixel, comprising:

means for generating a brightness/darkness setting value;

image segmentation means for generating an effect pointer based on an image type of a multi-level grey scale pixel to be processed and the generated brightness/darkness setting value;

screen means for selecting, from a plurality of screens, a screen according to the effect pointer, and for generating a screen value from the selected screen dependent upon a position of the pixel to be processed; and modifying means for generating a screened multi-level grey scale pixel value utilizing the screen value.

39. The system as claimed in claim 38, further comprising:

modulation means for generating a modulation multiplication factor based on the effect pointer, the modulation multiplication factor being based on image classification; and means for modifying the screen value by the modulation multiplication factor;

said modifying means generating a screened multi-level grey scale pixel value utilizing the modulation multiplication factor modified screen value.

40. The system as claimed in claim 39, further comprising:

dampening means for generating a dampening screen weight based on the multi-level grey scale pixel value; and said means for modifying further modifying the screen value based on the generated dampening screen weight;

said modifying means generating a screened multi-level grey scale pixel value utilizing the modulation multiplication factor and dampening screen weight modified screen value.

41. A system for screening a multi-level grey scale pixel value representing a pixel, comprising:

a brightness/darkness circuit to generate a brightness/darkness setting value;

an image segmentation circuit to generate an effect pointer based on an image type of a multi-level grey scale pixel to be processed and the generated brightness/darkness setting value;

a screen circuit, including a look-up table, to select, from a plurality of screens, a screen according to the effect pointer and to generate a screen value from the selected screen dependent upon a position of the pixel to be processed; and an adder to generate a screened multi-level grey scale pixel value based on the screen value.

42. The system as claimed in claim 41, further comprising:

modulation means for generating a modulation multiplication factor based on the effect pointer, the modulation multiplication factor being based on image classification; and modifying means for modifying the screen value by the modulation multiplication factor;

said adder generating a screened multi-level grey scale pixel value utilizing the modulation multiplication factor modified screen value.

43. The system as claimed in claim 42, further comprising:

dampening means for generating a dampening screen weight based on the multi-level grey scale pixel value; and said modifying means further modifying the screen value based on the generated dampening screen weight;

said adder generating a screened multi-level grey scale pixel value utilizing the modulation multiplication factor and dampening screen weight modified screen value.

* * * * *